US007460622B2

(12) United States Patent
Baker et al.

(10) Patent No.: US 7,460,622 B2
(45) Date of Patent: Dec. 2, 2008

(54) COMMUNICATIONS SYSTEMS AND METHODS

(75) Inventors: David Baker, Cambridge (GB); Mark Justin Moore, Cambridge (GB)

(73) Assignee: Artimi Ltd (GB)

( * ) Notice: Subject to any disclaimer, the term of this patent is extended or adjusted under 35 U.S.C. 154(b) by 616 days.

(21) Appl. No.: 10/893,533

(22) Filed: Jul. 19, 2004

(65) Prior Publication Data

US 2005/0078734 A1   Apr. 14, 2005

Related U.S. Application Data

(60) Provisional application No. 60/518,344, filed on Nov. 10, 2003.

(30) Foreign Application Priority Data

Jul. 18, 2003   (GB) ................................. 0316897.8

(51) Int. Cl.
*H03D 1/00* (2006.01)
*H04L 27/06* (2006.01)

(52) U.S. Cl. ..................... 375/343; 375/142; 375/150; 375/152; 375/316

(58) Field of Classification Search ................. 375/343, 375/142, 150, 152, 316
See application file for complete search history.

(56) References Cited

U.S. PATENT DOCUMENTS

| 4,514,852 | A  | * | 4/1985  | Hanni et al. ............... 380/38 |
| 6,483,461 | B1 |   | 11/2002 | Matheney et al. |
| 2002/0075972 | A1 | * | 6/2002  | Richards et al. ............ 375/324 |
| 2002/0137457 | A1 | * | 9/2002  | Nivens et al. .............. 455/13.4 |
| 2003/0086489 | A1 | * | 5/2003  | Hernandez et al. .......... 375/239 |
| 2003/0211828 | A1 | * | 11/2003 | Dalgleish et al. ........... 455/11.1 |
| 2004/0002637 | A1 | * | 1/2004  | Huang et al. ............... 600/300 |
| 2004/0017306 | A1 |   | 1/2004  | Miao |
| 2004/0022332 | A1 | * | 2/2004  | Gupta et al. ............... 375/343 |
| 2004/0122593 | A1 | * | 6/2004  | Haldorsen ................. 702/6 |
| 2005/0265503 | A1 | * | 12/2005 | Rofheart et al. ............ 375/354 |

FOREIGN PATENT DOCUMENTS

| GB | 2376858 A       | 6/2001  |
| WO | WO 01/22672 A1  | 3/2001  |
| WO | WO 01/93442 A1  | 12/2001 |

OTHER PUBLICATIONS

I. O'Donnell et al., "An Integrated, Low Power, Ultra-Wideband Transceiver Architecture For Low Rate, Indoor Wireless Systems," *IEEE CAS Workshop on Wireless Communications and Networking*, Sep. 5, 2002, pp. 1-8. (Retrieved from internet at http://bwrc.eecs.Berkeley.edu/Publications/2002/presentations/CAS2002/io_cas_paper_9_02.pdf.).
W. Namgoong, "A Channelized Digital Ultrawideband Receiver," *IEEE Transactions on Wireless Communications*, IEEE, Piscataway, US, vol. 2, No. 3, May 2003, pp. 502-510, XP001163633.
W. Namgoong, "A Channelized DSSS Ultra-Wideband Receiver," *Proceedings Rawcon 2001, 2001 IEEE Radio and Wireless Conference*, Aug. 19, 2001, pp. 105-108, XP010555643.
Hoyos et al., "Dithering and ΣΔ Modulation in Mono-Bit Digital Receivers for Ultra-Wideband Communications," *2003 IEEE Conference on Ultra Wideband Systems and Technologies*, Nov. 16, 2003, pp. 71-75, XP010683731.

* cited by examiner

*Primary Examiner*—Ted Wang
(74) *Attorney, Agent, or Firm*—Sterne, Kessler, Goldstein & Fox P.L.L.C.

(57) ABSTRACT

This invention generally relates to wired and wireless ultra wideband (UWB) data communications apparatus and methods, and in particular to UWB receiver systems and architectures.

An ultra wideband (UWB) receiver system comprising: a receiver front end to receive a UWB signal; an analogue-to-digital converter coupled to said receiver front end to digitize said received UBW signal; and a correlator coupled to said analogue-to-digital converter to correlate said digitized UWB signal with a reference signal.

13 Claims, 16 Drawing Sheets

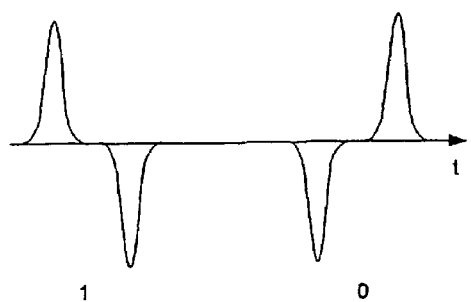 
Figure 2g (Prior Art)  Figure 2h (Prior Art)
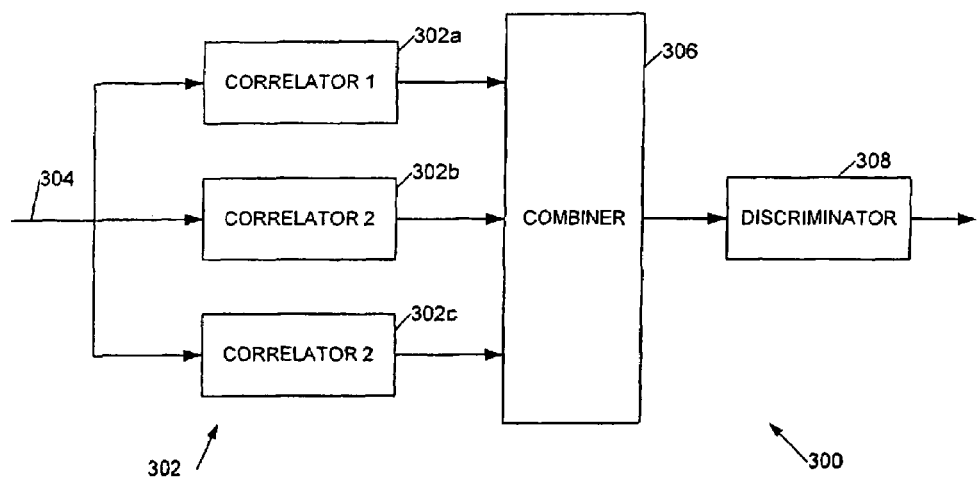
Figure 3a
(PRIOR ART)

COMMUNICATIONS SYSTEMS AND METHODS

FIELD OF THE INVENTION

This invention generally relates to wired and wireless ultra wideband (UWB) data communications apparatus and methods, and in particular to UWB receiver systems and architectures. The benefit of U.S. provisional 60/518,344 filed Nov. 10, 2003 is claimed.

BACKGROUND TO THE INVENTION

Techniques for UWB communication developed from radar and other military applications, and pioneering work was carried out by Dr G. F. Ross, as described in U.S. Pat. No. 3,728,632. Ultra-wideband communications systems employ very short pulses of electromagnetic radiation (impulses) with short rise and fall times, resulting in a spectrum with a very wide bandwidth. Some systems employ direct excitation of an antenna with such a pulse which then radiates with its characteristic impulse or step response (depending upon the excitation). Such systems are referred to as carrierless or "carrier free" since the resulting rf emission lacks any well-defined carrier frequency. However other UWB systems radiate one or a few cycles of a high frequency carrier and thus it is possible to define a meaningful centre frequency and/or phase despite the large signal bandwidth. The US Federal Communications Commission (FCC) defines UWB as a —10 dB bandwidth of at least 25% of a centre (or average) frequency or a bandwidth of at least 1.5 GHz; the US DARPA definition is similar but refers to a —20 dB bandwidth. Such formal definitions are useful and clearly differentiates UWB systems from conventional narrow and wideband systems but the techniques described in this specification are not limited to systems falling within this precise definition and may be employed with similar systems employing very short pulses of electromagnetic radiation.

UWB communications systems have a number of advantages over conventional systems. Broadly speaking, the very large bandwidth facilitates very high data rate communications and since pulses of radiation are employed the average transmit power (and also power consumption) may be kept low even though the power in each pulse may be relatively large. Also, since the power in each pulse is spread over a large bandwidth the power per unit frequency may be very low indeed, allowing UWB systems to coexist with other spectrum users and, in military applications, providing a low probability of intercept. The short pulses also make UWB communications systems relatively unsusceptible to multi-path effects since multiple reflections can in general be resolved. Finally UWB systems lend themselves to a substantially all digital implementation, with consequent cost savings and other advantages.

FIG. 1a shows an example of an analogue UWB transceiver 100. This comprises an transmit/receive antenna 102 with a characteristic impulse response indicated by bandpass filter (BPF) 104 (although in some instances a bandpass filter may be explicitly included), couples to a transmit/receive switch 106.

The transmit chain comprises an impulse generator 108 modulatable by a baseband transmit data input 110, and an antenna driver 112. The driver may be omitted since only a small output voltage swing is generally required. One of a number of modulation techniques may be employed, typically either OOK (on-off keying i.e. transmitting or not transmitting a pulse), M-ary amplitude shift keying (pulse amplitude modulation), or PPM (pulse position modulation i.e. dithering the pulse position). Typically the transmitted pulse has a duration of <1ns and may have a bandwidth of the order of gigahertz.

The receive chain typically comprises a low noise amplifier (LNA) and automatic gain control (AGC) stage 114 followed by a correlator or matched filter (MF) 116, matched to the received pulse shape so that it outputs an impulse when presented with rf energy having the correct (matching) pulse shape. The output of MF 116 is generally digitised by an analogue-to-digital converter (ADC) 118 and then presented to a (digital or software-based) variable gain threshold circuit 120, the output of which comprises the received data. The skilled person will understand that forward error correction (FEC) such as block error coding and other baseband processing may also be employed, but such techniques are well-known and conventional and hence these is omitted for clarity.

FIG. 1b shows one example of a carrier-based UWB transmitter 122. A similar transmitter is described in more detail in U.S. Pat. No. 6,026,125. This form of transmitter allows the UWB transmission centre frequency and bandwidth to be controlled and, because it is carrier-based, allows the use of frequency and phase as well as amplitude and position modulation. Thus, for example, QAM (quadrature amplitude modulation) or M-ary PSK (phase shift keying) may be employed.

Referring to FIG. 1b, an oscillator 124 generates a high frequency carrier which is gated by a mixer 126 which, in effect, acts as a high speed switch. A second input to the mixer is provided by an impulse generator 128, filtered by an (optional) bandpass filter 130. The amplitude of the filtered impulse determines the time for which the mixer diodes are forward biased and hence the effective pulse width and bandwidth of the UWB signal at the output of the mixer. The bandwidth of the UWB signal is similarly also determined by the bandwidth of filter 130. The centre frequency and instantaneous phase of the UWB signal is determined by oscillator 124, and may be modulated by a data input 132. An example of a transmitter with a centre frequency of 1.5 GHz and a bandwidth of 400 MHz is described in U.S. Pat. No. 6,026,125. Pulse to pulse coherency can be achieved by phase locking the impulse generator to the oscillator.

The output of mixer 126 is processed by a bandpass filter 134 to reject out-of-band frequencies and undesirable mixer products, optionally attenuated by a digitally controlled rf attenuator 136 to allow additional amplitude modulation, and then passed to a wideband power amplifier 138 such as a MMIC (monolithic microwave integrated circuit), and transmit antenna 140. The power amplifier may be gated on and off in synchrony with the impulses from generator 128, as described in U.S. Pat. No. '125, to reduce power consumption.

FIG. 1c shows a similar transmitter to that of FIG. 1b, in which like elements have like reference numerals. The transmitter of FIG. 1c is, broadly speaking, a special case of the transmitter of FIG. 1b in which the oscillator frequency has been set to zero. The output of oscillator 124 of FIG. 1b is effectively a dc level which serves to keep mixer 126 always on, so these elements are omitted (and the impulse generator or its output is modulated).

FIG. 1d shows an alternative carrier-based UWB transmitter 142, also described in U.S. Pat. No. 6,026,125. Again like elements to those of FIG. 1b are shown by like reference numerals.

In the arrangement of FIG. 1d a time gating circuit 144 gates the output of oscillator 124 under control of a timing signal 146. The pulse width of this timing signal determines the instantaneous UWB signal bandwidth. Thus the transmitted signal UWB bandwidth may be adjusted by adjusting the width of this pulse.

Ultra-wideband receivers suitable for use with the UWB transmitters of FIGS. 1*b* to 1*d* are described in U.S. Pat. No. 5,901,172. These receivers use tunnel diode-based detectors to enable single pulse detection at high speeds (several megabits per second) with reduced vulnerability to in-band interference. Broadly speaking a tunnel diode is switched between active and inactive modes, charge stored in the diode being discharged during its inactive mode. The tunnel diode acts, in effect, as a time-gated matched filter, and the correlation operation is synchronised to the incoming pulses.

FIG. 1*e* shows another example of a known UWB transmitter 148, described in U.S. Pat. No. 6,304,623. In FIG. 1*e* a pulser 150 generates an rf pulse for transmission by antenna 152 under control of a timing signal 154 provided by a precision timing generator 156, itself controlled by a stable timebase 158. A code generator 160 receives a reference clock from the timing generator and provides pseudo-random time offset commands to the timing generator for dithering the transmitter pulse positions. This has the effect of spreading and flattening the comb-like spectrum which would otherwise be produced by regular, narrow pulses (in some systems amplitude modulation may be employed for a similar effect).

FIG. 1*f* shows a corresponding receiver 162, also described in U.S. Pat. No. '623. This uses a similar timing generator 164, timebase 166 and code generator 168 (generating the same pseudo-random sequence), but the timebase 166 is locked to the received signal by a tracking loop filter 170. The timing signal output of timing generator 164 drives a template generator 172 which outputs a template signal and a correlator/sampler 176 and accumulator 178 samples and correlates the received signal with the template, integrating over an aperture time of the correlator to produce an output which is sampled at the end of an integration cycle by a detector 180 to determine whether a one or a zero has been received.

FIG. 1*g* shows a UWB transceiver 182 employing spread spectrum-type coding techniques. A transceiver of the general type is described in more detail in U.S. Pat. No. 6,400,754, to which reference may be made.

In FIG. 1*g* a receive antenna 184 and low noise amplifier 186 provide one input to a time-integrating correlator 188. A second input to the correlator is provided by a code sequence generator 190 which generates a spread spectrum-type code such as a Kasami code, that is a code with a high auto-correlation coefficient from a family of codes with low cross-correlation coefficients. Correlator 188 multiplies the analogue input signal by the reference code and integrates over a code sequence period and may comprise a matched filter with a plurality of phases representing different time alignments of the input signal and reference code. The correlator output is digitised by analogue-to-digital converter 192 which provides an output to a bus 194 controlled by a processor 196 with memory 198 the code sequence generator 190 is driven by a crystal oscillator driven clock 200 a transmit antenna driver 202 receives data from bus 194 which is multiplied by a code sequence from generator 190 and transmitted from transmit antenna 204. In operation coded sequences of impulse doublets are received and transmitted, in one arrangement each bit comprising a 1023-chip sequence of 10 ns chips, thus having a duration of 10 μs and providing 30 dB processing gain. Shorter spreading sequences and/or faster clocks may be employed for higher bit rates.

The transceiver described in U.S. Pat. No. 6,400,754 uses a modification of a frequency-independent current-mode shielded loop antenna (described in U.S. Pat. No. 4,506,267) comprising a flat rectangular conducting plate. This antenna is referred to as a large-current radiator (LCR) antenna and when driven by a current it radiates outwards on the surface of the plate.

FIG. 1*h* shows a driver circuit 206 for such an LCR transmit antenna 208. The antenna is driven by an H-bridge comprising four MOSFETs 210 controlled by left (L) and right (R) control lines 212, 214. By toggling line 214 high then low whilst maintaining line 214 low an impulse doublet (that is a pair of impulses of opposite polarity) of a first polarity is transmitted, and by toggling line 212 high then low whilst holding line 214 low an impulse doublet of opposite polarity is radiated. The antenna only radiates whilst the current through it changes, and transmits a single gaussian impulse on each transition.

FIGS. 2*a* to 2*h* show some examples of UWB waveforms, FIG. 2*a* shows a typical output waveform of a UWB impulse transmitter, and FIG. 1*b* shows the power spectrum of the waveform of FIG. 2*a*. FIG. 2*c* shows a wavelet pulse (which when shortened becomes a monocycle) such as might be radiated from one of the transmitters of FIGS. 1*b* to 1*d*. FIG. 2*d* shows the power spectrum of FIG. 2*c*. FIG. 2*e* shows an impulse doublet and FIG. 2*f* the power spectrum of the doublet of FIG. 2*e*. It can be seen that the spectrum of FIG. 2*f* comprises a comb with a spacing (in frequency) determined by the spacing (in time) of the impulses of the doublet and an overall bandwidth determined by the width of each impulse. It can also be appreciated from FIGS. 2*e* and 2*f* that dithering the pulse positions will tend to reduce the nulls of the comb spectrum. FIG. 2*g* shows examples of basis impulse doublet waveforms for a logic 0 and a logic 1. FIG. 2*h* shows an example of a TDMA UWB transmission such as might be radiated from the transceiver of FIG. 1*g*, in which bursts of Code Division Multiple access (CDMA)-encoded data are separated by periods of non-transmission to allow access by other devices.

Ultra wideband communications potentially offer significant advantages for wireless home networking, particularly broadband networking for audio and video entertainment devices, because of the very high data rates which are possible with UWB systems. However, UWB communications also present a number of special problems, most particularly the very low transmit power output imposed by the relevant regulatory authorities, in the US the FCC. Thus the maximum permitted power output is presently below the acceptable noise floor for unintentional emitters so that a UWB signal effectively appears merely as noise to a conventional receiver. This low power output limits the effective range of UWB communications and there is therefore a need to address this difficulty.

One way to improve the range of a UWB communications link is to adopt a rake receiver type approach to combine the energy in a plurality of multipath components of a received signal. Multipath effects arise when a signal from a transmitter to a receiver takes two or more different paths (multipaths) such as a direct path between a transmit and receive antenna and an indirect path via reflection off a surface. In a multipath environment two or more versions of a transmitted signal arrive at the receiver at different times. Most wireless environments, and in particular indoor environments, have significant levels of multipath which, in a conventional RF communications system, typically produces a comb-like frequency response, the multiple delays of the multipath components of the received signal giving the appearance of tines of a rake. The number and position of multipath channels generally changes over time, particularly when one or both of the transmitter and receiver is moving.

It is helpful to briefly review the operation of a conventional rake receiver before going on to consider a known UWB rake-type receiver.

In a spread spectrum communication system a baseband signal is spread by mixing it with a pseudorandom spreading sequence of a much higher bit rate (referred to as the chip rate) before modulating the rf carrier. At the receiver the baseband signal is recovered by feeding the received signal and the pseudorandom spreading sequence into a correlator and allowing one to slip past the other until a lock is obtained. Once code lock has been obtained, it is maintained by means of a code tracking loop such as an early-late tracking loop which detects when the input signal is early or late with respect to the spreading sequence and compensates for the change. Alternatively a matched filter may be employed for despreading and synchronisation.

Such a system is described as code division multiplexed as the baseband signal can only be recovered if the initial pseudorandom spreading sequence is known. A spread spectrum communication system allows many transmitters with different spreading sequences all to use the same part of the rf spectrum, a receiver "tuning" to the desired signal by selecting the appropriate spreading sequence (CDMA—code division multiple access).

One advantage of conventional spread spectrum systems is that they are relatively insensitive to multipath fading. A correlator in a spread spectrum receiver will tend to lock onto one of the multipath components, normally the direct signal which is the strongest. However a plurality of correlator may be provided to allow the spread spectrum receiver to lock onto a corresponding plurality of separate multipath components of the received signal. Such a spread spectrum receiver is known as a rake receiver and the elements of the receiver comprising the correlator are often referred to as "fingers" of the rake receiver. The separate outputs from each finger of the rake receiver are combined to provide an improved signal to noise ratio (or bit error rate) generally either by weighting each output equally or by estimating weights which maximise the signal to noise ratio of the combined output ("Maximal Ratio Combining"—MRC).

FIG. 3a shows the main components of a typical rake receiver 300, A bank of correlators 302 comprises, in this example, three correlators 302, 302 and 302 each of which receives a CDMA spread spectrum signal from input 304. The correlators are known as the fingers of the rake; in the illustrated example the rake has three fingers. The CDMA signal may be at baseband or at IF (Intermediate Frequency). Each correlator locks to a separate multipath component which is delayed by at least one chip with respect to the other multipath components. More or fewer correlators can be provided according to a quality-cost/complexity trade off. The despread output from a correlator is a signal with a magnitude and phase modified by the attenuation and phase shift of the multipath channel through which the multipath component locked onto by the finger of the rake receiver has been transmitted. A channel estimate comprising a complex number characterising the phase and attenuation of the communications channel, in particular for the multipath component of the channel the rake finger has despread, may be obtained, for example using a training sequence. The channel estimate may then be conjugated to invert the phase (and optionally normalised) and used to multiply the received signal to compensate for the channel.

The outputs of all the correlators go to a combiner 306 such as an MRC combiner, which adds the outputs in a weighted sum, generally giving greater weight to the stronger signals. The weighting may be determined based upon signal strength before or after correlation, according to conventional algorithms. The combined signal is then fed to a discriminator 308 which makes a decision as to whether a bit is a 1 or a 0 and provides a baseband output. The discriminator may include additional filtering, integration or other processing. The rake receiver may be implemented in either hardware or software or a mixture of both.

The effects of multipath propagation on UWB transmissions are not the same as on conventional RF transmissions. In particular where a UWB signal comprises a succession of wavelets or pulses (the terms are used substantially synonymously in the specification), because of the short duration and relatively long separation (in time) of these pulses it is often possible to substantially time-resolve the pulses belonging to multipath components of the UWB signal. In simple terms, the delays between the arrival of pulses in different multipath components originating from a single transmitted UWB pulse are often long enough to make it unlikely that two pulses arrive at the same time. This is described further below and can be exploited to advantage in a UWB receiver design.

It is known to apply conventional rake receiver techniques to UWB communications systems, as described for example in WO01/93441, WO01/93442, and WO01/93482. FIG. 3b, which is taken from WO01/93482, shows such a transceiver; similar arrangements are described in the other two specifications.

Referring to FIG. 3b, this shows a UWB transmitter $7_0$, 21, 17, 23, 25, 27, 1 and a UWB receiver 1, 27, 3, 29, 31, $1_{-N}$, $7_{1-N}$, 9. The receiver comprises a plurality of tracking correlators $31_1$-$31_N$ together with a plurality of timing generators $7_1$-$7_N$, and as described in WO '482 (page 15) during a receive mode of operation the multiple arms can resolve and lock onto different multipath components of a signal. By coherent addition of the energy from these different multipath signal components the received signal to noise ratio may be improved. However the design of '482 is relatively physically large, expensive and power hungry to implement and fails to take advantage of some aspects of UWB multipath transmission.

SUMMARY OF THE INVENTION

In one aspect the invention provides an ultra wideband (UWB) receiver system comprising a receiver front end to receive a UWB signal; an analogue-to-digital converter coupled to said receiver front end to digitise said received UWB signal; and a correlator coupled to said analogue-to-digital converter to correlate said digitised UWB signal with a reference signal.

Digitising the received UWB signal prior to correlation with a reference signal helps to reduce the cost, size, and power consumption of the receiver by facilitating further processing in accordance with a number of digital techniques as described below. For example one digital correlator correlating a pair of signals (the received and reference signals) may be employed to correlate a received pulse having a plurality of multipath components, rather than a separate correlation being needed for each separate multipath component. Correlation speed may also be increased by correlating a set of digitised samples of an incoming UWB signal with a reference signal. More generally digitising prior to the correlator facilitates time multiplexing of a correlator, for example storing partial or intermediate correlation results, and thus facilitates the provision of a much larger number of correlators than might otherwise be possible, thus helping to provide an improved signal to noise ratio. Multiple correlators may be employed in parallel, for example for pipelined correlation operations, and by multiplexing correlators in the time domain, sharing a single correlator between different multipath components of the same pulse and/or between different pulses a plurality of logically parallel correlators may be provided by a single physical correlator. In a preferred embodiment the UWB signal is a carrierless signal comprising a plurality of pulses or wavelets, thus facilitating such time multiplexing since much of the reference wave form is then substantially zero, comprising short pulses separated by longer periods of substantially zero signal, providing spaces in which a correlator or multiple-accumulator may be multiplexed for use in correlating other (later or earlier) transmitted pulses. Thus the correlator can be faster, more efficient, smaller and potentially cheaper.

As UWB signals by their nature have a very wide bandwidth, for example 500 MHz or greater even when the UWB spectrum is subdivided into bands, the analogue-to-digital converter preferably operates at $10^9$ samples per second and may operate at $10^{10}$ samples per second or more. Since such fast analogue-to-digital conversion can have a high power consumption the reference signal, for example from a reference signal generator, may be used to control a power supply to the converter so that the power consumption of the converter can be reduced in periods where there is no expected received signal (pulse). Thus the converter may be inhibited or its power effectively removed during periods when no multipath component of a pulse is expected. Thus in another aspect the invention provides a method of controlling an analogue-to-digital converter in accordance with these techniques.

As the received UWB signal may be at a very low level or even in the noise (because there may be redundancy in the transmitted data, for example by distributing a data bit over a plurality of successively transmitted pulses) an analogue-to-digital converter with a multiple bit resolution is indicated. However the number of bits required may be reduced by employing a controllable gain device such as a switched or programmable attenuator prior to the analogue-to-digital converter and controlling this using the reference signal. Thus when a low level multipath component is expected the gain may be increased or attenuation reduced. In some circumstances a one bit analogue-to-digital converter may even be employed, which simplifies later correlation since a one-bit multiply may be implemented by means of an EXOR gate. Optionally one or more statistical characteristics of the received UWB signal may be monitored in order to adjust the signal prior to digitisation.

Where the UWB signal comprises a plurality of pulses a plurality of correlation or multiply-accumulate modules may be employed to perform a plurality of correlations substantially in parallel between the digitised UWB signal and differently delayed versions of the reference signal to locate a pulse. As described further below in embodiments it is highly advantageous to delay the reference signal rather than the digitised sample data as using a look-up table in memory it is relatively straightforward to generate differently delayed versions of a stored signal. In embodiments this provides much faster signal acquisition and tracking than a conventional sliding window or early-late approach thus facilitating managing the very fast stream of data from the analogue-to-digital converter. The skilled person will appreciate that the bandwidth of the digital 'pipe' from this converter is roughly three orders of magnitude wider than the level at which conventional digital RF processing generally takes place (10 GHz as compared with 10 MHz).

In preferred embodiments each of the correlation modules correlates a plurality of multipath components of a transmitted pulse and where these interleave but do not substantially overlap a correlation module may be time multiplexed to correlate multipath components of successively transmitted pulses with the reference signal. This further facilitates rapid processing of the digitised incoming UWB signal. Where correlation is performed against a plurality of multipath components a single template may be used for all multipath components but preferably a separate template is used for at least some of or each of the multipath components for improved correlation with the received signal. The reference signal template for one or more multipath components may be derived by training the receiver. For example an associated UWB transmitter may be employed to directly transmit a signal to the receiver to calibrate out or at least compensate for phase and/or gain distortions or non-linearities introduced by the receiver (analogue) front end and/or analogue-to-digital converter. This is important in a UWB system since the ultra wideband input stage will generally have phase and gain characteristics which vary significantly over the receiver bandwidth thus introducing significant distortions to the transmitted pulse shape. The associated transmitter may provide a timing signal directly to the receiver, for example across a direct wired connection, so that the receiver knows when to store received data into a reference signal memory in order to construct a receive signal template. A second training stage may optionally (but preferably) also be applied in which a signal from a remote transmitter is acquired using the stored reference signal and then used to store a second reference signal which takes account of the distortions introduced by the channel for each multipath component.

It will be appreciated that the above described correlator may be employed to locate the position of a pulse in time (pulse-position modulation). However in preferred embodiments the correlator includes a discriminator which may be employed to determine the phase of a received pulse, for example determining whether the pulse is upright or inverted (bi-phase modulation). This bi-phase determination effectively comes at no extra cost to the pulse position determination and is effectively co-determined with the pulse position. This permits a doubling in the number of data bits to be sent as compared with either pulse position modulation or bi-phase modulation when used separately. Although it is known to dither the position of bi-phase pulses, for example using a pseudorandom sequence, it has not previously been recognised that a pulsed UWB signal may be modulated with information data to be communicated across a UWB link using pulse position modulation (PPM) in which a pulse position is dependant upon the information data and at the same time bi-phase modulation (or M-ary phase modulation) in which the pulse phase is also dependant upon the information data, two or more information bits being encoded as a combination of pulse phase and pulse position.

Preferably the analogue-to-digital converter comprises a plurality of A-to-D conversion modules to provide a plurality of successively delayed samples of the UWB signal substantially in parallel, for example using a phase-tapped clock. The correlator may then be configured to process these successively delayed samples substantially simultaneously to allow a time-slice of the received signal to be correlated with a time-slice of the reference signal, preferably the time-slice having sufficient duration to encompass a substantial portion of a pulse within the UWB signal. Since a single transmitted pulse is generally received as a set of multipath components each comprising a version of the pulse the time-slice preferably extends over the duration of a pulse of a multipath component rather than over the entire set of multipath components which may be significantly delayed with respect to one another. A correlator to correlate time-slices of the received and reference signals each comprising a plurality of samples may comprise a plurality of multipliers in parallel coupled to a common accumulator.

The reference signal is preferably provided from a reference signal memory, and advantageously within this memory the reference signal may be stored as a set of pulse shapes each separated by a delay, each pulse shape representing an expected pulse shape of a received multipath component of a transmitted pulse. Thus in a preferred embodiment the reference signal memory stores sets of data samples defining pulse shapes and associated data values defining delays between these pulses, that is between the reception of different multipath components of a pulse.

Preferably the reference signal memory is configured to provide a plurality of stored reference signal values for different, successively delayed versions of the reference signal substantially simultaneously. This facilitates rapid location of the exact position in time of a multipath component of a pulse since the successively delayed versions of the pulse may be correlated with the incoming received signal in parallel. Thus the reference signal memory preferably has a plurality of outputs so that when the memory is addressed each of these outputs can provide a data sample corresponding to a different point on the stored reference signal waveform. In fact, as described above, it is preferable for the reference signal memory to have a plurality of sets of outputs each set of outputs providing a time-slice of samples of the stored reference signal extending over a period approximately equal to or greater than the duration of a multipath component of a pulse, the sets of samples being successively delayed to provide, in effect, successively delayed pulse shapes. It is further preferable that the delay of each set of samples, that is of each pulse shape, should correspond to an integral number (such as one) sample periods so that these successively delayed sets of samples may be provided by appropriate wiring of outputs from the memory. For example first and second sets of 16 samples delayed by one sample will have 15 sample values in common and need only 17 outputs from the memory to provide 32 sets of samples defining two pulse shapes delayed by one sample with respect to one another.

Preferably the receiver system also includes a controller for identifying data in a received UWB signal which can be written into the reference signal memory for use as a template in later correlations. This facilitates training of the receiver to perform correlations with unexpected received UWB signal rather than an ideal UWB signal. It will be appreciated that the controller need not itself read the digitised signal to be used as a template but need only identify which portion of an incoming signal may be employed for this purpose, for example using the correlator. In some embodiments more than one reference signal may be stored. For example a reference signal may be stored for each of a plurality of transmitters from which the receiver system receives signals, allowing a different reference signal to be employed for each transmitter, and therefore allowing the receiver to compensate for the potentially different multipath channel to each transmitter. The reference signal for a transmitter may then be selected according to which transmitter the receiver is communicating with (or in some embodiments correlations with more than one reference signal may be performed effectively in parallel, for example by multiplexing).

In a related aspect the invention provides an ultra wideband (UWB) receiver system for reception of UWB signals from a plurality of UWB transmitters, the receiver system comprising: a receiver front end to receive a said UWB signal; a correlator coupled to said receiver front end to correlate said UWB signal with a reference signal; and means to select one of a plurality of said reference signals for receiving a signal from a corresponding one of said transmitters.

The above described features and aspects of the invention may advantageously be combined and permuted, as will be understood by the skilled person.

BRIEF DESCRIPTION OF THE DRAWINGS

These and other aspects of the present invention will now be further described, by way of example only, with reference to the accompanying figures in which:

FIGS. 2a to 2h show examples of UWB waveforms;

FIGS. 3a and 3b show, respectively, the main elements of a conventional rake receiver for spread-spectrum signals, and a block diagram of a known UWB transceiver employing conventional rake receiver techniques;

FIGS. 13a and 13b show, respectively, a reference waveform generation system, and a variant of the system of FIG. 13a;

DETAILED DESCRIPTION OF THE PREFERRED EMBODIMENTS

As previously mentioned a transmission medium coupling a UWB transmitter and UWB receiver will typically give rise to a number of physical effects that complicate the function of the receiver. The transmission medium may comprise a wireless or wired transmission channel. The physical effects include multiple path reflections, which result in multiple pulses at the receiver or each transmitted pulse, in some cases these pulses being phase inverted. Dispersion, frequency dependent continuation and other properties of the transmission medium distort the pulse shape. Interference and noise sources are received in addition to the desired pulse data. Noise sources include thermal noise (from the receiver itself), narrow band interference from radio transmitters sharing the same frequency spectrum, and broadband interference (from switching and alike). There may also be interference from co-located UWB systems sharing the same physical space for electrical cabling. A UWB receiver should preferably be capable of dealing with all these effects.

Figure 1A:
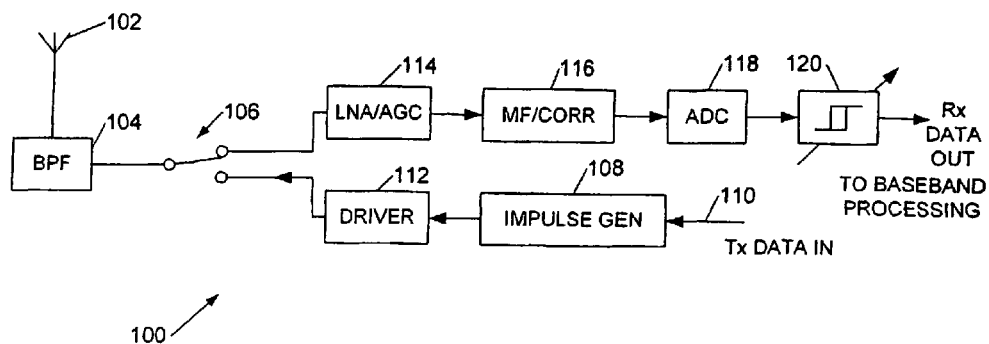
FIGS. 1a to 1h show, respectively, a typical UWB transceiver, a first example of a carrier-based UWB transmitter, a variant of this first example transmitter, a second example of a carrier-based UWB transmitter, a third example of a UWB transmitter, a receiver for the third example transmitter, a UWB transceiver employing spread spectrum techniques, and a driver circuit for a large-current radiator antenna.
Figure 1B:
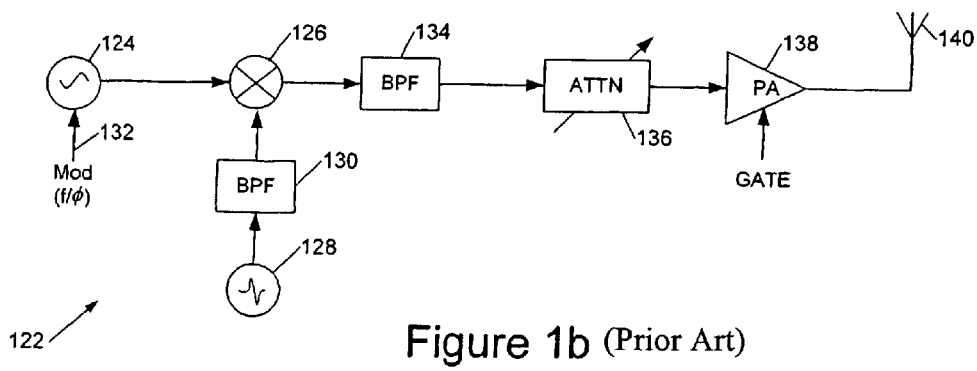
Figure 1C:
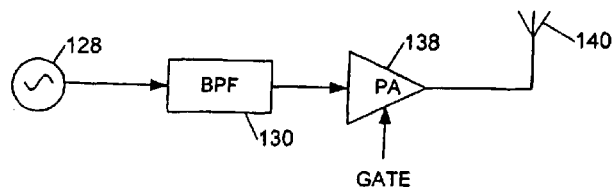
Figure 1D:
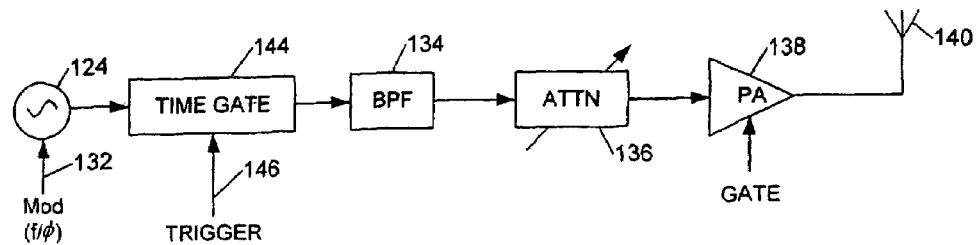
Figure 1E:
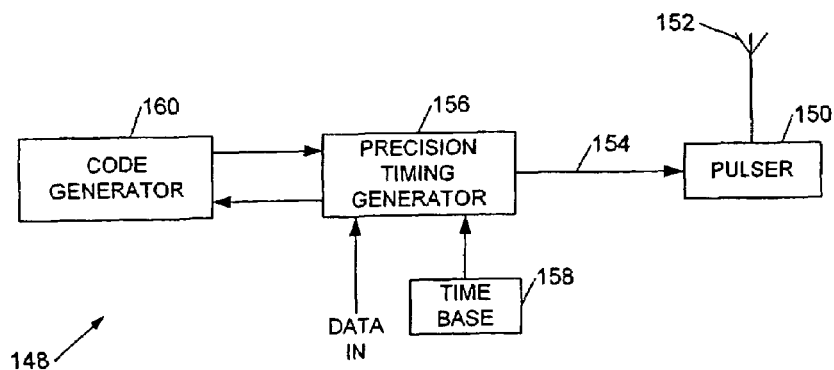
Figure 1F:
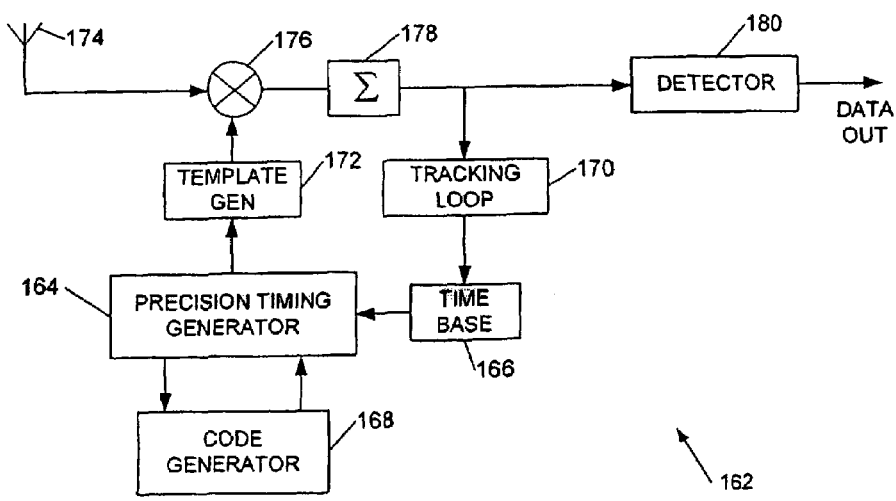
Figure 1G:
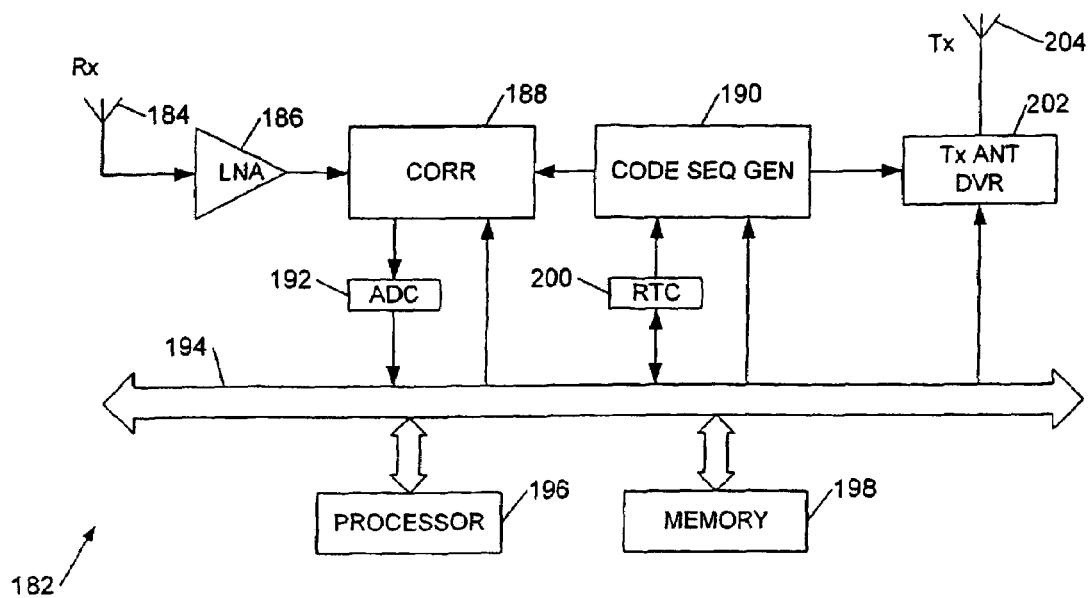
Figure 1H:
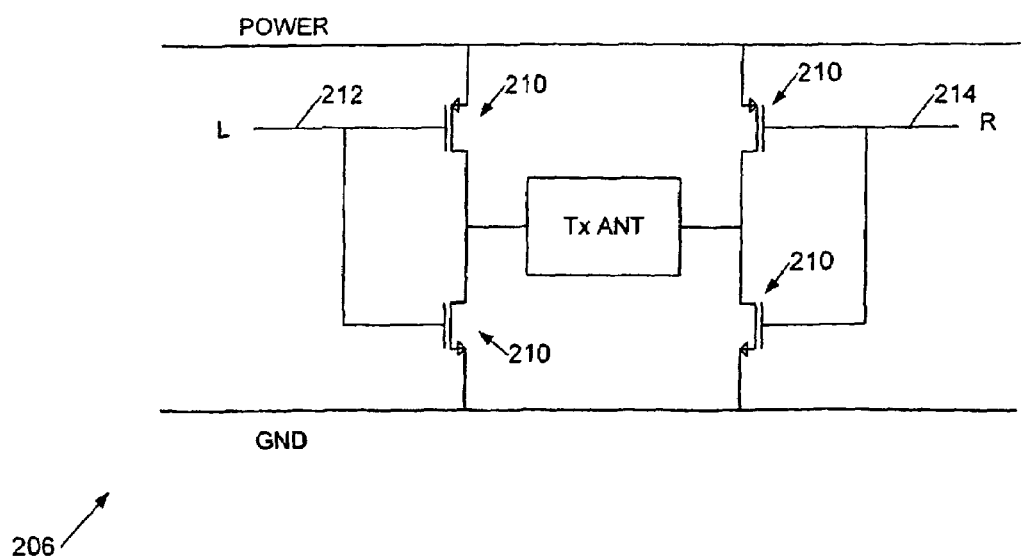
Figure 2A:
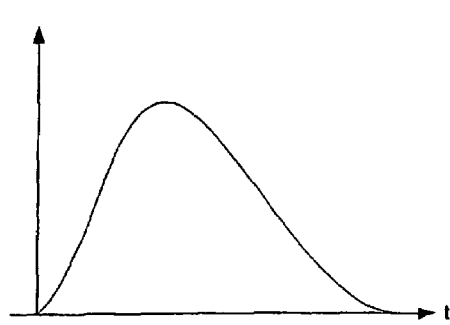
Figure 2B:
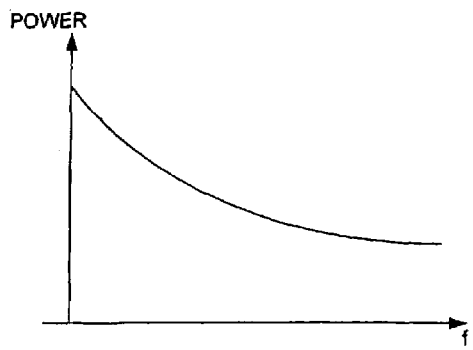
Figure 2C:
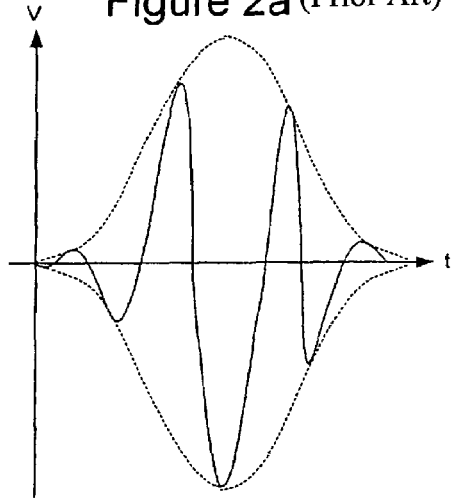
Figure 2D:
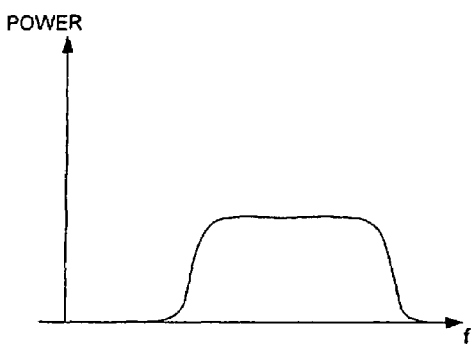
Figure 2E:
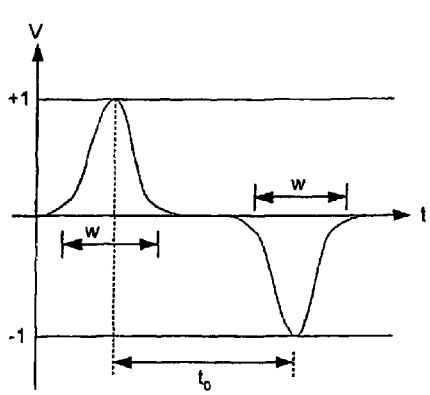
Figure 2F:
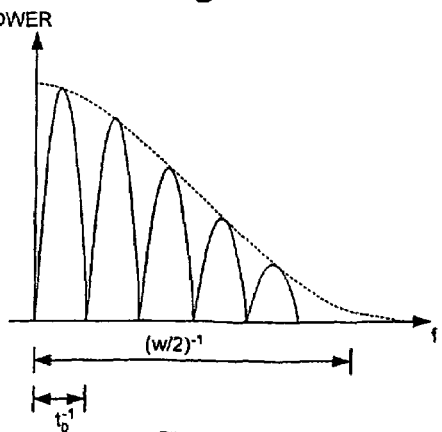
Figure 3B:
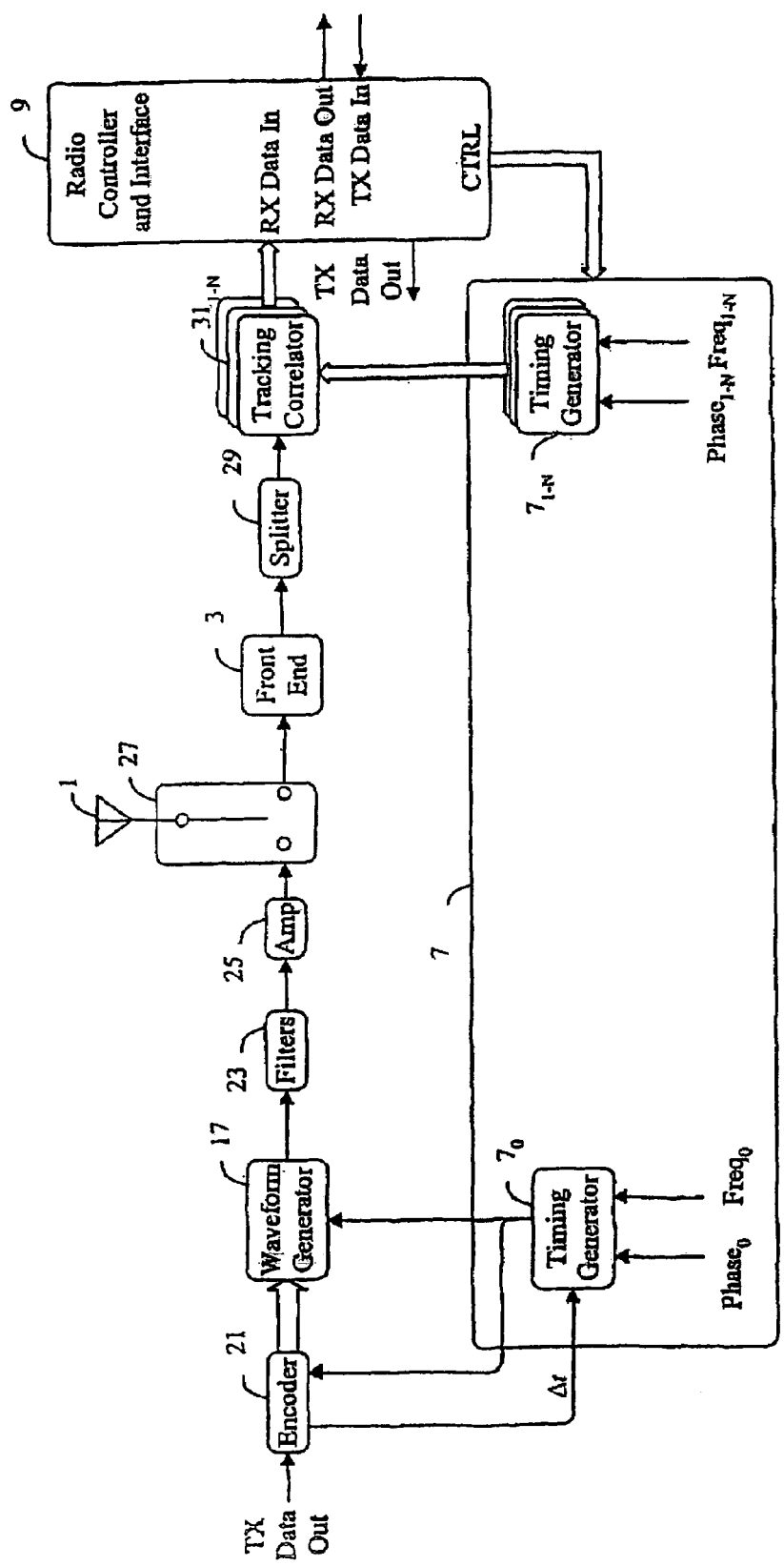
Figure 4A:
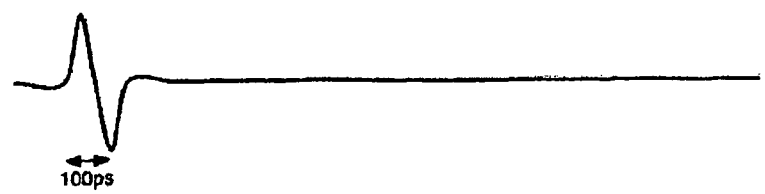
FIGS. 4a to 4d show, respectively, a transmitted UWB signal comprising a single pulse, an example of a received version of the transmitted pulse of FIG. 4a with multipath reflections and other propagation effects, a series of transmitted UWB pulses of the type shown in FIG. 4a, and a received signal corresponding to the transmitted signal of FIG. 4c showing overlapping multipath reflections.
Figure 4B:
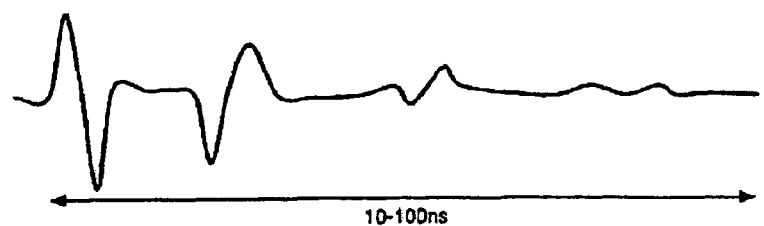

Referring now to FIG. 4, FIG. 4a shows an example of a transmitted UWB pulse, which in this example has a duration of approximately 100 ps. FIG. 4b shows the same pulse as it might be seen by a UWB receiver. As can be seen the received pulse has a plurality of multipath components and also exhibits distortion and other propagation effects. Multipath components are received over a time scale which depends upon the transmission channel but which may, for example, be between 10 ns and 100 ns (the pulses shown in this diagram are not to scale), multipath at the longer end of this range being observed in wired systems such as UWB over mains (AC power cable) transmissions as described in the co-depending UK Patent Application No. 0222828.6 filed on 2 Oct. 2002. The first received multipath component need not be the largest (as shown in FIG. 4b) and may be significantly distorted or even inverted.

Figure 4C:
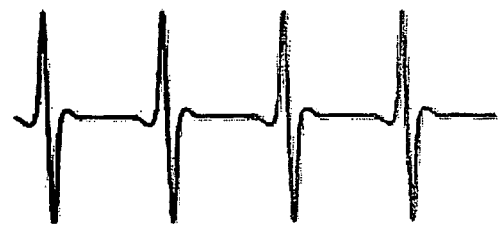
Figure 4D:
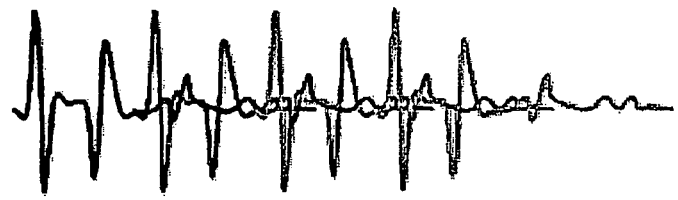

FIG. 4c illustrates a series of transmitted pulses and FIG. 4d an example of a corresponding received signal. It can be seen that multipath reflections from one pulse may overlap with the first signals from the next pulse. This problem is exasperated when timing modulation is applied to a transmitted pulse.

Figure 5:
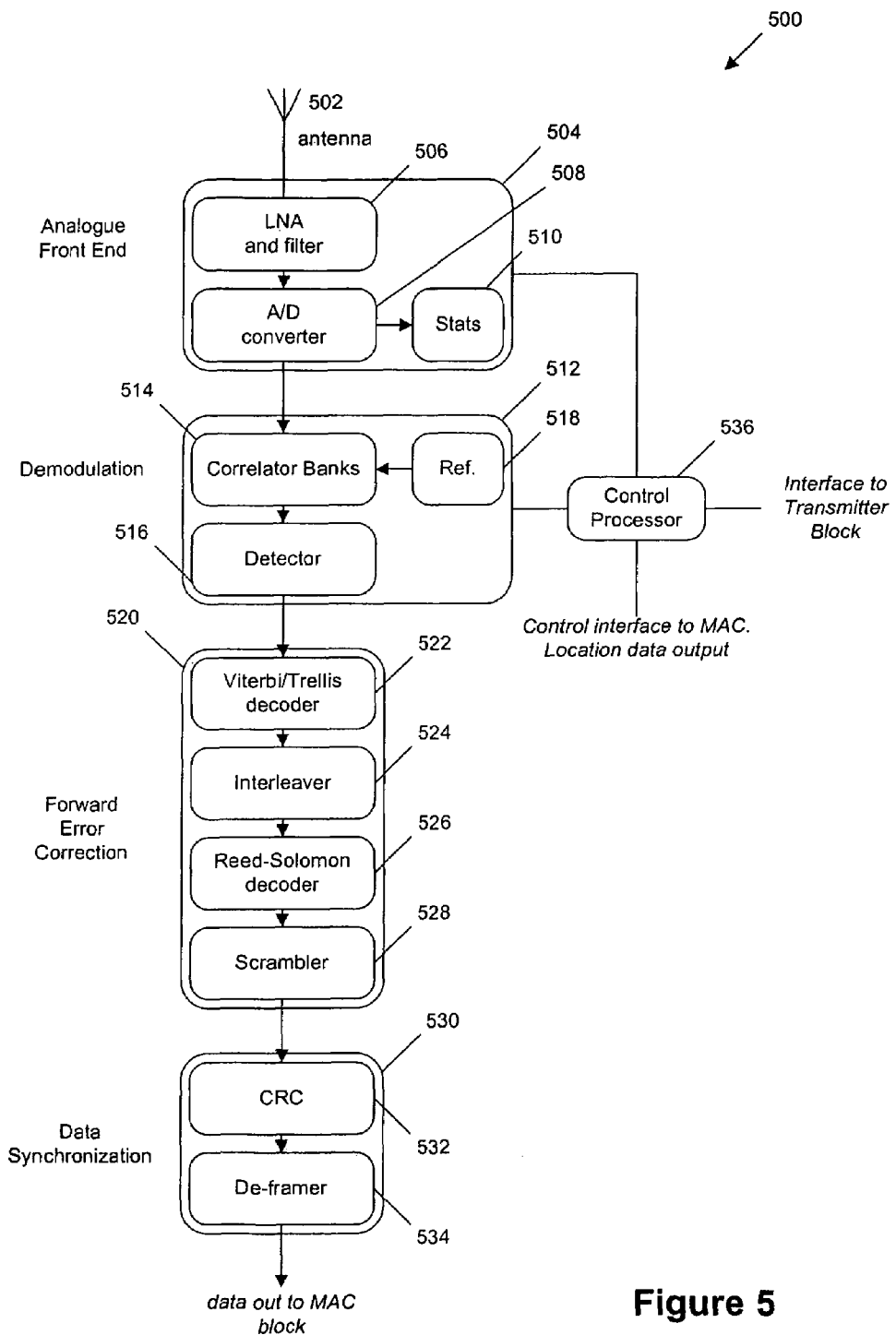
FIG. 5 shows an overview block diagram of a UWB receiver embodying aspects of the present invention.

FIG. 5 shows a block diagram of a UWB receiver 500 embodying an aspect of the present invention.

An incoming UWB signal is received by an antenna 502, which may comprise a capacitive an/or inductive coupling to a cable system such as a mains power cable or a telephone cable. The received UWB signal is provided to an analog front end block 504 which comprises a low noise amplifier (LNA) and filter 506 and an analog-to-digital converter 508. A set of counters or registers 510 is also provided to capture and record statistics relating to the received UWB input signal. The analog front end 504 is primarily responsible for converting the received UWB signal into digital form.

The digitised UWB signal output from front end 504 is provided to a demodulation block 512 comprising a correlator bank 514 and a detector 516. The digitised input signal is correlated with a reference signal from a reference signal memory 518 which discriminates against noise and the output of the correlator is then fed to the defector which determines the n (where n is a positive integer) most probable locations and phase values for a received pulse.

The output of the demodulation block 512 is provided to a conventional forward error correction (FEC) block 520. In one implementation of the receiver FEC block 520 comprises a trellis or Viterbi state decoder 522 followed by a (de) interlever 524, a Reed Solomon decoder 526 and (de) scrambler 528. In other implementations other codings/decoding schemes such as turbo coding may be employed.

The output of FEC block is then passed to a data sychronisation unit 530 comprising a cyclic redundancy check (CRC) block 532 and de-framer 534. The data sychronisation unit 530 locks onto and tracks framing within the received data separating MAC (Media Access Control) control information from the application data stream(s) providing a data output to a subsequent MAC block (not shown).

A control processor 536 comprising a CPU (Central Processing Unit) with program code and data storage memory is used to control the receiver. The primary task of the control processor 536 is to maintain the reference signal that is fed to the correlator to track changes in the received signal due to environmental changes (such as the initial determination of the reference wave form, control over gain in the LNA block 506, and on-going adjustments in the reference wave form to compensate for external changes in the environment).

Referring now to the analog front end 504 in more detail, in a preferred arrangement the LNA block 506 amplifies the signal received from the antenna or cable coupling. The amplifier design contains a fixed frequency passive filter that rejects signals out side of the FCC/ETSC permitted spectral band (3.1-10.6 GHz), as well as rejecting signals from the 5 GHz UNII frequency band. Rejection of such signal areas prevents strong narrow band transmissions from saturating the subsequent A/D converter. It is particularly important to reject signals that are likely to be co-located with a UWB device, such as 802.11, Bluetooth and mobile phone frequencies.

The LNA also contains a switchable attenuator that may be used to adjust the signal level fed to the A/D unit. The attenuator may be controlled directly by both the control processor 536 and the reference signal. The purpose of the attenuator is to avoid input saturation at the A/D unit, while maintaining sufficient sensitivity to detect the received pulse waveform.

The reference waveform from the Detector unit may also control the attenuation in real time, allowing different gain settings to be applied to different portions of the multipath signals that are received from a single pulse. The A/D converter 508 may take a variety of forms. In a preferred embodiment the A/D converter 508 is logically configured as a continuous sampler, effectively providing a continuous stream of samples at a suitable rate as determined by the upper frequency of the relevant UWB band and the Nyqust criterion, for example 20 G samples per seconds (20 GHz) for a 10 GHz upper frequency. Physically, however, the A/D module may comprise a bank of samplers, for example 16 to provide 16 samples for each received pulse, successively triggered by a phase tapped clock to provide a snapshot of a portion of a received UWB signals at different phases which may then be used to provide an input to the correlator banks 514 of demodulation block 512. In this way parallel blocks of signal samples may be provided at a rate of a few hundred megahertz, for example at substantially the pulse repetition frequency (PRF) rate thus effectively reducing the primary digitisation clocks speed to this rate; preferably each block substantially spans the duration of a received UWB pulse. Implementing the sampler as a plurality of parallel sampling circuits operating of a phase tapped reference clock facilitates the fabrication of suitable sample (and hold) devices on conventional silicon processors.

Some examples of fast A/D converters are the described in the following documents, which are hereby incorporated by referenced: "A 20 GSamples/s 8-Bit A/D Convertor with a 1 MB memory in 0.18 μCMOS presented by Brian Setterberg of Agilent Technologies, Inc., at the 2003 IEEE International Solid-State Circuit Conference (ISSCC)"; "A Serial-Link Transceiver Based on 8-Gsamples/s A/D and D/A Converters in 0.25 μm CMOS presented by Chih-Kong Ken Yang, Vladimir Stojanovic, Siamak Modjtahedi, Mark A, Horowitz and William F. Ellersick, IEEE Journal of Solid-State Circuits, Vol 36, No 11, November 2001"; published US Patent Applications 2002 0167373 and 2002 0145484.

Depending upon the application the A/D converter may either be a single-bit converter or a multi-bit converter, and may either monitor the received voltage level or the power level in the received signal. The A/D converter 508 may comprise a non-continuous sampler where the sampler is run only around the expected time of arrival of a received pulse (or around a desired time slice when hunting for a received pulse) and is substantially inactive at other times. In this way a high sampling rate may effectively be achieved but with advantages such as reduced power consumption.

In general, it is desirable to gain as much information about the input signal as possible, favouring a multi-bit voltage sensitive sampling scheme. However, implementation constraints (physical silicon area and power consumption) mean that such a scheme is preferably only used for devices where immunity to noise (including unexpected narrow band interference) is important, for example where operation in close proximity to an 802.11 system is envisaged. In some arrangements sure bit conversion permits an acceptable compromise.

Non-continuous sampling can offset some of the disadvantages of such a sampler, but can constrain the range of possible delay modulation values that can be detected, thereby reducing the potential information that can be carried by each pulse. Such a trade-off is often acceptable in systems where there are many co-located independent pulse transmissions, since the risk of 'collisions' between pulses from different transmissions is reduced.

Single bit sampling is prone to saturation but offers a significant saving in silicon cost and power consumption and is therefore preferable level based A/D converters benefit from accurate control the input signal gain. The AFE 504 therefore preferably contains counters that monitor statistics of the input signal conversion, recording the number of values recorded in each of the sampling levels over some period of time. Software running on the Control Processor periodically reads these values and resets the counters. The software may then use these to determine an optimum setting for the gain/attenuation control applied to the received signal by LNA unit 506. For such purposes, the software may assume that the received signal is, on average, a gaussian noise signal.

Referring now to the demodulator block 512, this is responsible for extracting a data signal imposed on the pulses by a transmitter.

The scheme described here is specifically designed to decode modulation by means of the pulse arrival time or by the pulse phase. It may also be adapted to detect modulation by means of the pulse shape (spectral modulation).

The input to the demodulator is a stream of sample data from the AFE 504; the output is a stream of decoded data bits. The output data rate is substantially constant fixed by the PRF (Pulse Repetition Frequency) and the number of bits encoded by each pulse. The operating parameters of the demodulator (PRF and bit-encoding) are typically fixed for a given transmitter. However, the demodulator (and other system parameters, such as AFE gain) may be time multiplexed by the MAC processor in order to facilitate near simultaneous reception from multiple transmitters.

The demodulator contains units to correlate the received signal against a reference signal (programmed and maintained to track changes in the external signal propagation environment) by control processor 536. The detailed form of the demodulator is shown in FIG. 6.

Figure 6:
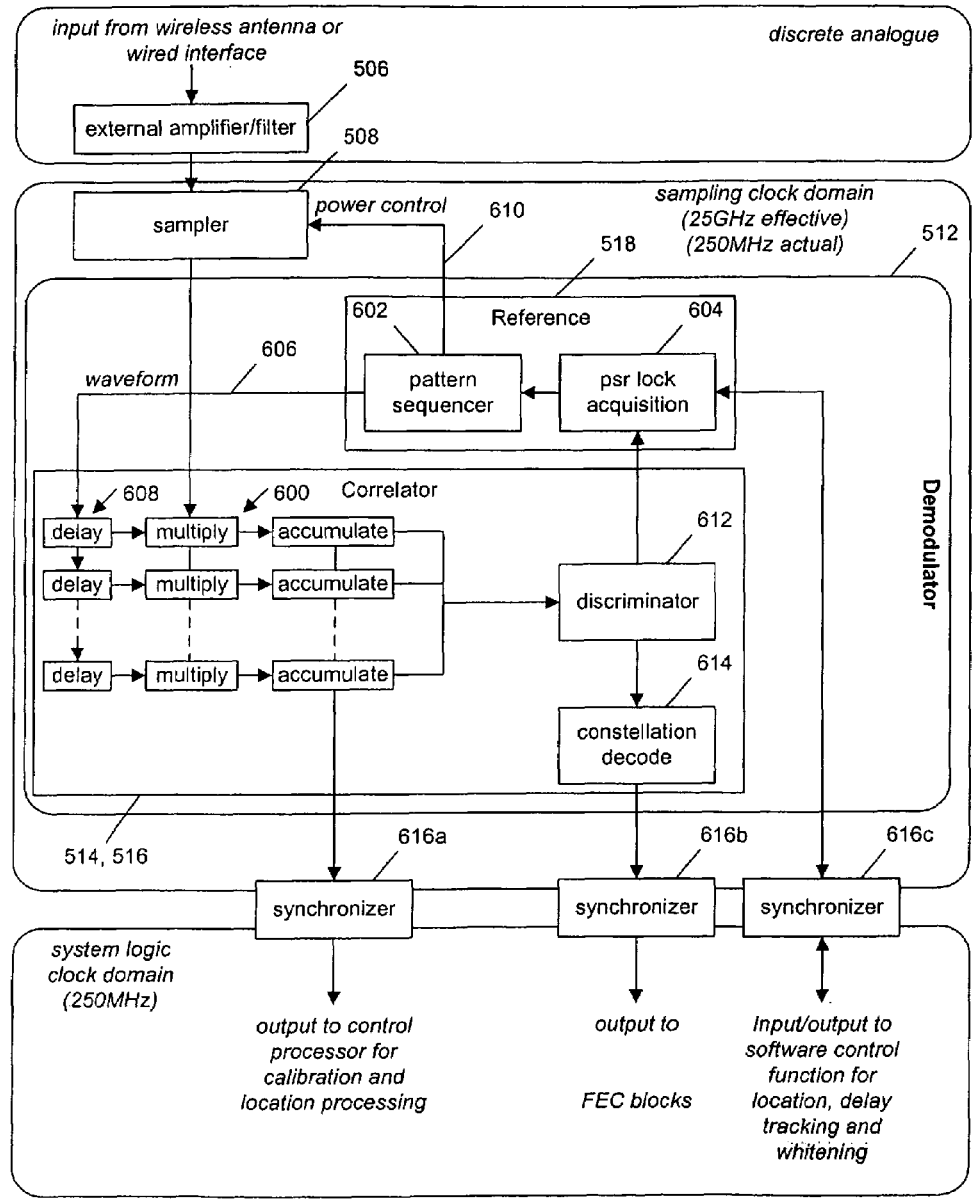
FIG. 6 shows a simplified block diagram of a demodulator architecture for use with the receiver of FIG. 5.

Referring to FIG. 6, this shows a simplified block diagram of demodulator 512 of FIG. 5; like elements to those of FIG. 5 are indicated by like reference numerals. The input from the wireless antenna or wired interface and amplifier/filter unit 506 is implemented in discrete analog circuitry, and the A/D (sampler) 508 and demodulator 512 are implemented in the sampling clock domain which has, in one embodiment, an effective range of 25 GHz, corresponding to an actual clock rate of 250 MHz. The system control logic and output to the forward error correction apparatus also operates at 250 MHz.

The correlator 514 comprises a bank of multiply-accumulate units 600 each of which receives an input signal sample (comprising a set of samples of the input signal at successive sampling intervals) and multiplies this by a reference sample (comprising a set of samples of a reference waveform at successive sampling intervals) provided by reference waveform synthesiser 518. In the case of single bit A/D sampling the multiplier operation may be implemented using a simple XOR gate. The accumulators average the (correlation) data over a number of pulses, by averaging over (successive) transmitted pulses bearing the same encoded data and/or averaging over multipath components.

The reference signal generator or synthesiser 518 provides the reference signal to the multiply-accumulate units 600 under control of a pattern sequencer 602. The pattern sequencer is controlled by a PSR (Pseudo Random) sequence lock acquisition module 604, preferably implemented in software as described later. Conceptually the pattern sequencer 602 provides a reference waveform 606 to a plurality of delay units 608 to provide a plurality of successively delayed versions of the reference waveform to multiply-accumulate units 600. However although illustrated as a pipeline system with multiply-accumulated delay taps equivalent to a sample period to reduce the effective clock speed the reference waveform is preferably applied in parallel to the multiply-accumulate units 600 as described later. Such a parallel implementation is possible because the reference waveform is stored in memory and therefore a parallel set of differently delayed reference waveforms may be read out from the memory substantially simultaneously; implementation of the demodulator would be significantly more complex were delay taps conceptually applied to the incoming received UWB signal sample data since without additional complexity this would not be readily available in the form of successively delayed time windows of samples of parallel in samples.

The reference signal for the correlator is programmed into the reference signal generator 518 by software running on control processor 536, which preferably uses a training algorithm to determine the receiver response (that is, amptitude and phase distortion to a transmitted pulse). The control processor 536 also maintains a clock phase locked to the PRF (Pulse Repetition Frequency) of the transmitter from which signals are being received by using the arrival times of detected pulses relative to an internal timing reference (Local Crystal Oscillator). A power control output 610 from the reference waveform generator may also be employed to gate power to the A/D and sampling circuitry 508 to put this circuitry into a reduced power mode in periods where there is no expected received signal. This is particularly advantageous in systems using a multi-bit A/D since these often have a relatively large power consumption.

A multiply-accumulate unit 600 provide outputs to a discriminator 612 which determines the sign and peak value (or values if probabilistic outputs are supplied to the following stage of the (absolute) value maximum accumulator output). The discriminator outputs provide an output data signal identifying the position of a received pulse and the pulse phase (that is, normal or inverted). A constellation decoder maps this position/phase data from the discriminator to an n-bit symbol which is then passed to the forward error correction block 520.

The demodulator 512 has a plurality of interfaces to other parts of the receiver system, each of which is preferably via a data synchroniser 616a, b, c, such as a register or buffer. Thus the multiply-accumulate units 600 provide an output to the control processor 536 for calibration of the receiver front end (and preferably also the transmission channel) and for location processing to facilitate physical location of a UWB receiver according to known techniques. The interface between the constellation decoder 614 and FEC blocks 520 is preferably also implemented via a buffer. The PSR lock acquisition module 502 preferably has a bi-directional interface to a software control function implemented on control processor 536 to provide functions such as physical location of the receiver, delay tracking, and data (de) whitening.

Figure 7:
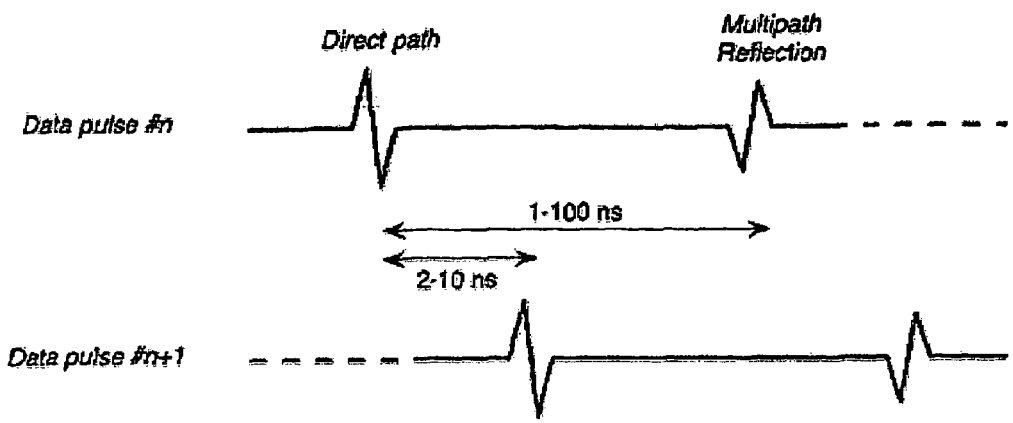
FIG. 7 shows a timing diagram illustrating timing variations of multipath components of a pulse with respect to pulse repetition frequency.

Referring next to FIG. 7 this shows relative timings of transmitted data pulses and multipath components of such pulses as seen by the receiver. As can be seen from FIG. 7 a typical delay span for a multipath reflection is between 1 and 100 ns whereas a typical interval between successive transmitted data pulses is between 2 and 10 ns. It can therefore be appreciated that a multipath reflection of a one pulse may arrive following a direct, line of sight transmission of the next pulse, or even of the next few pulses. The multipath reflections may also be phase inverted subject to different path distortions from the direct path.

In a simple but less preferred arrangement the multiply-accumulate stages 600 of the correlator only integrate multi-path energy over the inter-transmit pulse period so that, for example in FIG. 7, multipath components arriving outside the 2-10 ns delay range would be ignored. However in general typical multipath delays are greater than the average inter-transmit pulse period, and thus significant energy may be lost with this approach. The problem is exacerbated if pseudo-random timing jitter is applied to the timing of the transmitted pulses to achieve spectral whitening.

For these reasons it is therefore preferable to implement two or more correlator banks, that is banks of multiply-accumulate units 600 as shown in FIG. 6, parallel to facilitate pipelining of the pulse integrations. Such parallelism implemented by repetition of the correlator logic but in a preferred arrangement this parallelism is achieved by multiplexing the use of a single set of multiply-accumulate chains 600, for example by keeping track of distinct sets of accumulator values in a static RAM (Random Access Memory) buffer memory.

Figure 8:
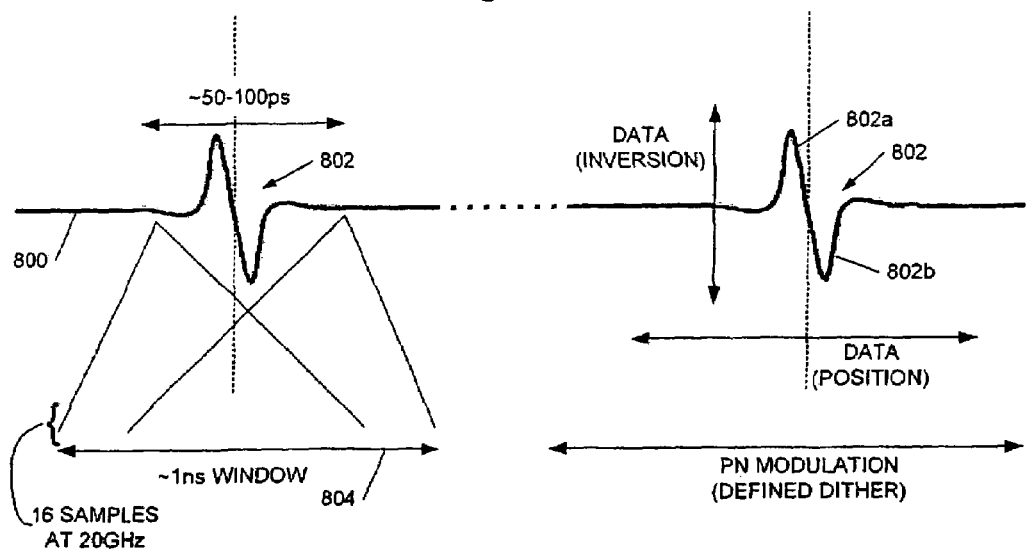
FIG. 8 shows diagrammatically a modulation scheme for use with the D modulator of FIG. 6.

FIG. 8 shows a schematic diagram of a UWB signal employing a preferred modulation scheme for the above described receiver and which may be generated by a transmitter described later with reference to FIG. 10. The signal of FIG. 8 may be employed in a wireless or wired UWB transmission system.

The signal 800 comprises a plurality of wavelets or pulses 802 each of which has either a normal or inverted form to encode a single bit of information data to be transmitted; FIG. 8 shows two normal (rather than inverted) examples of such pulses. As illustrated, according to a preferred such a wavelet or pulse comprises a positive-going portion 802a and negative-going portion 802b; the order of these two portions may be reversed to invert the pulse, thus facilitating generation of normal and inverted pulses in hardware. The pulses 802 have a nominal pulse repetition frequency, for example of the order of 100 MHz. However an additional one or more information data bits may be modulated onto signal 800 by varying the precise position (timing) of a pulse dependent upon the data to be transmitted. For various reasons bi-phase modulation of a UWB signal has been the preferred modulation of many applications. However by also varying the pulse position more data may be encoded onto the UWB signal thus increasing the available data rate for the options for forward error correction at a given data rate and hence the range of a signal. In practical schemes it is further preferable to dither the pulse position (in time) in a deterministic manner to further whiten the UWB signal spectrum and hence reduce the overall signal profile and/or facilitate staying within regulatory boundaries. Thus in addition to the precise timing of a pulse being dependent upon variable information data to be transmitted the pulse position may also be dependent upon a pseudo random or PN (pseudo noise) signal. Such a pseudo random sequence is preferably deterministic so that although apparently random once the sequence and start point is known it can be reconstructed in a deterministic manner at the receiver to allow this PN modulation to be effectively subtracted from the received signal or compensated for in other ways.

Preferably the PN modulation is greater than the information data modulation since having a relatively small range of pulse positions about an expected pulse position (once the effects of PN modulation have been compensated for) simplifies demodulation of position-encoded data. In one preferred arrangement, described below, the positions a pulse can take in response modulation by information data are separated by one (or more generally an integral number) of reference (and input) UWB signal sampling intervals. Thus in some preferred embodiments a pulse 802 may take one of eight or 16 different positions in time (although other numbers of positions may be employed) and correlator 514 correlates the input signal with reference signals at all of these positions substantially in parallel to, in a parallel operation, locate the actual or most likely position of a received pulse. As shown in FIG. 8 according to a typical scheme the duration of a single doublet is typically between 50 ps and 100 ps and the correlator bank 514 performs parallel correlation operations over a time window 804 of approximately ins, thus identifying the pulse as being in one of around 16 overlapping positions. The skilled person will understand that the above timings, and the number of parallel multiply-accumulate units 600 of correlator 514 may be varied according to the requirements of a particular implementation or application.

Figure 9A:
FIGS. 9a and 9b show, respectively, a data frame format and pilot tone pulses for the receiver of FIG. 5.

FIG. 9a shows one example of an MAC frame 900 for use with the receiver 500 when receiving a signal of the type shown in FIG. 8. This MAC frame is, however, provided merely for illustrative purposes and many other different frame formats may be employed. The example MAC frame 900 begins with a preamble sequence 902 comprising 32 bits of preamble data, for example pseudo random data for training. This is followed by a 4 byte header comprising a pseudo random sequence identifier and a pseudo random sequence seed (for identifying a starting point in a sequence), for example as a pair of 2 byte values. Different pseudo random sequences may be employed by different transmitters to help avoid collisions between transmitted UWB data signals. The header is preferably structured to give the appearance of noise, and may therefore include a whitening function—for example the pseudo random sequence identifier and seed may each be selected so that the header appears essentially random. The header is followed by payload data 906 which may also be whitened of a fixed or variable length, for example 128 bytes.

Figure 9B:

FIG. 9b schematically illustrates the positions of pilot tone pulses within a UWB signal 910 also comprising information-carrying pulses (not shown). In one arrangement one in every 100 pulses comprises a pilot tone pulse and, as can be seen from FIG. 9b, these pilot tone pulses occur at regularly spaced intervals to provide a low-level pilot tone within the UWB signal regulatory spectral mask. Optionally the positions (in time) of the pilot tone pulses may be modulated to provide timing jitter, allowing more frequent or stronger pilot tone pulses within the spectral mask, although this is not necessary.

Figure 10A:
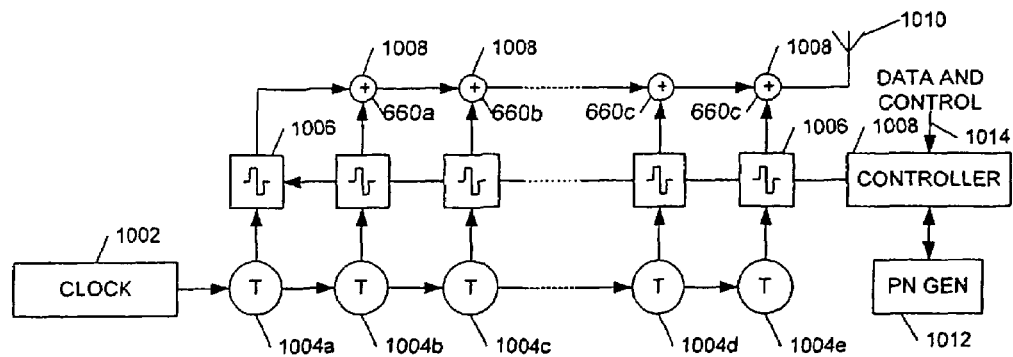
FIGS. 10a and 10b show, respectively, a UWB transmitter and a pulse generator for the UWB transmitter.
Figure 10B:
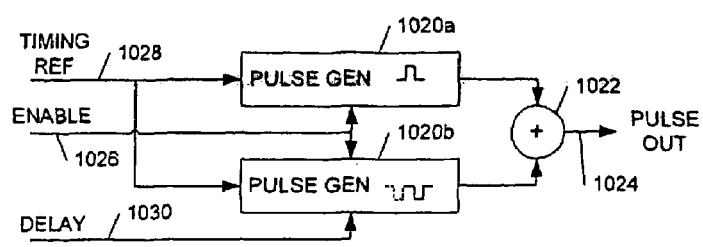

FIGS. 10a and 10b illustrate an example of a UWB transmitter 1000 which may be employed to generate the information data modulated UWB signal 800 of FIG. 8. The transmitter structure of FIG. 10 is provided by way of example only and other transmitter structures may also be employed to generate the UWB signal of FIG. 8. For simplicity forward error coding arrangements are not explicitly shown in the figure.

Referring to FIG. 10a a clock 1002 operating at, for example, 250 MHz provides a clock signal to a chain of delay elements 1004a-e each providing a delay of, in this example, 40 ps. The successively delayed versions of the clock signal are provided to each of a plurality of monostable pulse generators 1006, each of which also receives an enable and control input from a controller 1008. When enabled by the controller 1008 a monostable 1006 provides an output pulse doublet; the phase (normal or inverted) of the pulse doublet is also controllable by controller 1008. The outputs from all of the monostable pulse generators 1006 are combined, in this example in summers 1008 and the combined output is provided to a transmit antenna 1010. The controller 1008 receives a pseudo random sequence input from a pseudo noise generator 1012, and also receives a data and control input 1014, for example from a preceding forward error correction block and from a transmitter control processor. The data and control input receives information data to be transmitted by the transmitter and control signals such as a timing control signal to control when the transmitter is to transmit and/or pseudo noise sequence selection and start point control signals. The controller 1008 may comprise a state machine implemented in either software or dedicated hardware or a combination of the two.

In operation the controller 1008 controls the timing of transmitted UWB pulses and the phase (normal or inverted) of these pulses by providing appropriate enable and phase control signals to the monostable pulse generators 1006 which are then triggered to provide output pulses at the corresponding time by the phase tapped clock from clock signal generator 1002.

Referring now to FIG. 10b this shows an example of one implementation of a monostable 1006 for the transmitter of FIG. 10a. The monostable comprises two pulse generators 1020a, b, one providing a positive-going pulse, the other providing a negative-going pulse, outputs from these two pulse generators being combined in a summer 1022 to provide a pulse doublet output signal 1024. Both of pulse generators 1020a and 1020b are controlled by a common enable line 1026 which when asserted enables the pulse generators to provide an output pulse in response to an input timing reference signal on line 1028, but which when de-asserted disables the pulse generators from providing their outputs. In addition pulse generator 1020b has a delay signal input 1030 which delays the production of its output pulse by two cycles to effectively invert the pulse doublet. Thus according to whether or not the delay input 1030 is asserted a pulse doublet comprising either a positive or negative-going pulse or a negative then positive-going pulse is provided. A UWB transmitter such as a transmitter 1000 of FIG. 10 may be combined with the UWB receiver of FIG. 5 to provide a UWB transceiver. In this case it is preferable that the UWB transmitter and receiver portions of the transceiver are synchronised to a common PRF clock to avoid self-collision, that is to avoid jamming reception of transmissions from a remote transmitter by local transmissions.

Referring next to FIG. 11, this shows details of the receiver 500 of FIG. 5, and in particular details of the signal acquisition and locking system, including details of the reference signal capture signal. Like elements of those to FIGS. 5 and 6 are shown by like reference numerals. Broadly speaking the functions of the PSR lock acquisition module 604 are provided by a phase control processor and the functions of the pattern sequencer 602 of FIG. 6 are provided by a combination of a reference waveform data table and of a PSR sequence generator.

As previously described the analog front end and A/D converter 504 provides a plurality of examples of a received UWB input signal in parallel to correlator 514 and each set of input signal samples is processed by a correlator comprising one of multiply-accumulate units 600 of correlator 514 to correlate the set of received samples in parallel with sets of reference signals representing differently delayed pulses. The sets of samples defining differently delayed versions of a referenced signal pulse are derived from a waveform of a pulse stored in a reference waveform data table 1100. A reference received pulse is preferably stored in this table as a pulse shaped for each of a set of multi part components of the pulse together with data representing delay intervals between these multipath components, as shown in FIG. 11b. However differently delayed versions of a pulse may be provided by accessing a common wave shape data store for the pulse. As shown in FIG. 11b a reference or template waveform for a single received pulse having a plurality of multipath components comprises sample data 102 for a plurality of successive sample points of a multipath component of a pulse followed by delay data 1104 representing an interval between that multipath component of the pulse and the next multipath component. An input 1106 allows reference waveform data to be written into the referenced waveform data table 1100. Reference waveform data is provided to the correlator 514 from the data table 1100 under control of a PSR sequence generator 1108 in synchronisms with a PRF clock input 1110.

A phase control processor 1112 provides a PRF clock to sequence generator 1108 and reference waveform data to data table 1100. The phase control processor includes a processor and non-volatile program memory storing program code for pilot tone identification, to provide a software phase locked loop (PLL), for multipath component identification, and for template wave shape retrieval and storage. A clock 1114 provides a clock signal to the phase control processor and receives tracking data from processor 1112 comprising a time advance/retard signal for controlling the phase of the clock and a frequency increase/decrease for controlling the frequency of the clock when the phase needs to be consistently advanced/retarded. The clock 1114 is thus adjustable to track movement of the receiver with respect to the transmitter by means of systematic adjustment in the clock timing (which are generally small compared with the modulation). As described further below clock 1114 acts as a slave to a similar clock in a remote transmitter and thus acts as a link clock; typically it has a frequency in the range 50-200 MHz.

The phase control processor 1112 provides a control output to a UWB transmitter 1116, such as transmitter 1000 in FIG. 10, to control the transmitter to provide a UWB signal from a transmit antenna 1118 for use in training receiver. The control processor 1112 also receives a starter frame input signal 1120 from a MAC state machine implemented in either hardware or software. The phase control processor 1112 further receives a set of inputs 1122, one from each accumulator of correlator 514, and a further input 1124 from the output of discriminator 612.

Broadly speaking, in operation the phase control processor 1112 programs the reference waveform data table 1100 with an initial, predetermined wave shape and then identifies the UWB signal pilot tone and runs a software phase lock loop to lock onto this tone to provide a time reference. The processor then uses this to identify the wave shape of a received pulse, including its multipath components. Optionally the processor 1112 may apply a Fast Fourier Transform (FFT) filter to remove narrow band interference. Broadly speaking to locate the multipath components of a transmitted pulse the phase control processor 1112 scans a sample window by shifting the phase of the PRF clock with respect to the internal clock from clock generator 1114, integrating to obtain an average sampled data wave shape. Initially the multipath component with the strongest signal is identified and the shape of this multipath component of the pulse determined from the input data, and then the processor hunts for other multipath components both backwards and forwards from the strongest signal (because the direct line of sight pulse may not be the strongest). As previously described the correlator operates with blocks of eight or 16 samples and these blocks are effectively positional in time with respect to the link clock reference from clock generator 1114. Preferably the multipath component pulse tracking procedure is repeated at a frequency in the order of kilohertz in order to track variations in the multipath channel and, in embodiments where implemented, to obtain physical location information relating to the receiver's position. In wired UWB transmission systems the multipath environment may be quasi static in which case a channel characterisation procedure such as that described above may only be applied at switch on or, for example, when the error rate increases above a threshold.

Figure 11A:
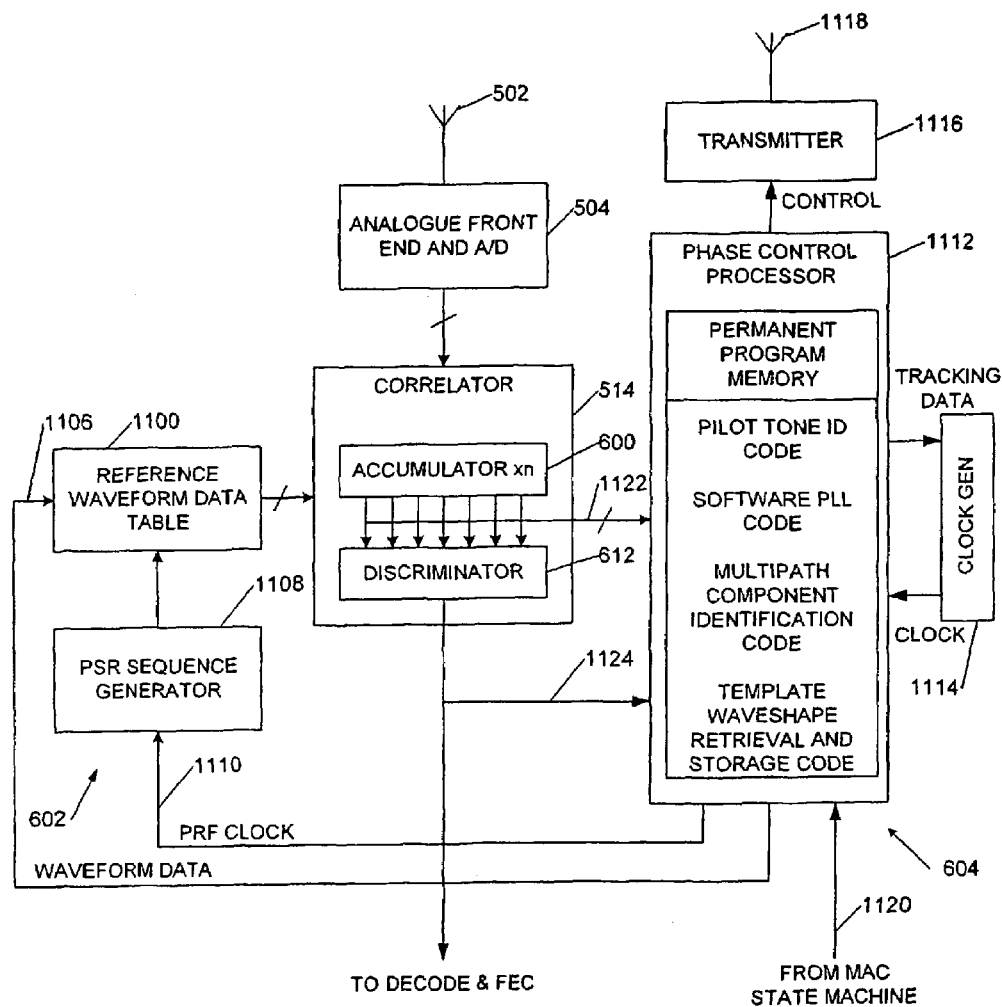
FIGS. 11a and 11b show, respectively, a signal acquisition and tracking system for the receiver of FIG. 5, and a waveform memory data format.
Figure 11B:
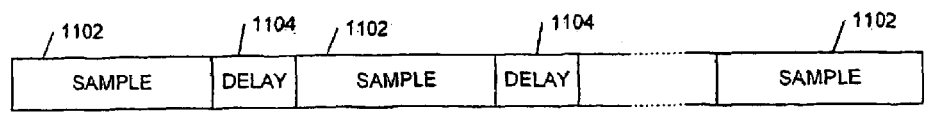

In the arrangement shown in FIG. 11a the phase control processor receives sampled input signal data via the correlator 514. This simplifies the architecture of the receiver, although in other arrangements processor 1112 may receive sampled input signal data directly from analog front end 504. To obtain sample input data from correlator 514 the input data may be correlated with a delta function such as a spike or impulse written into the wave form data table.

Figure 12A:
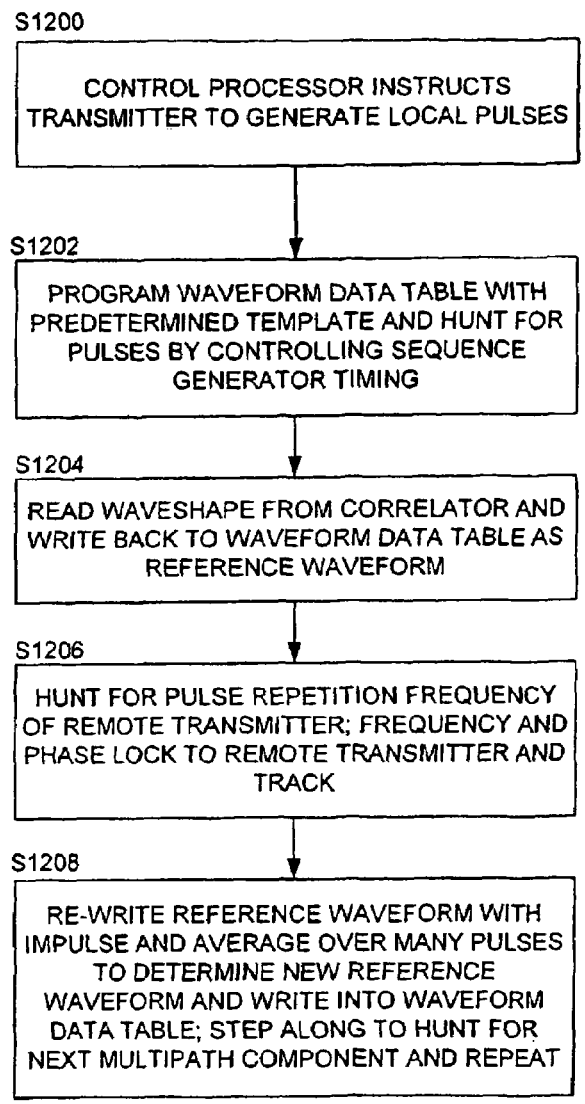
FIGS. 12a and 12b show, respectively, a flow diagram of a signal acquisition procedure, and a diagrammatic illustration of a signal hunt process.

FIG. 12a shows a flow diagram explaining further the operation of the phase control processor 1112 of FIG. 11a. To initial calibrate the receiver front end the control processor, at step S1200, instructs transmitter 1116 to local UWB pulses under control of the local clock generator 1114. These pulses are received at a very high signal level and, moreover, processor 1112 knows when these pulses are transmitted and thus knows at what position in time the received input data is expected to comprise a transmitted pulse (taking account of the delay introduced by the separation between transmit antenna 1118 and receive antenna 502 (typically one or a few centimeters)).

At step S1202 processor 1112 programs wave form data table 1100 with a predetermined template, in particular an impulse, and hunts for the transmitted pulses by controlling the timing of PSR sequence generator 1108. This is conveniently performed by inhibiting generation of a pseudo random sequence so that the phase of the output of generator 1108 may be varied by using the PSR seed as a phase offset adjust. Once the locally transmitted pulses are identified the wave shape of a pulse as received and digitised by analog front end 504 is read from correlator 514 and written into the referenced wave form data table to serve as an initial reference wave form. This in effect calibrates out phase and gain non-linearities in the receiver front end. Although the locally received signal is strong the wave shape data written into the data table 1100 may optionally comprise an average of a plurality of received pulses.

Figure 12B:
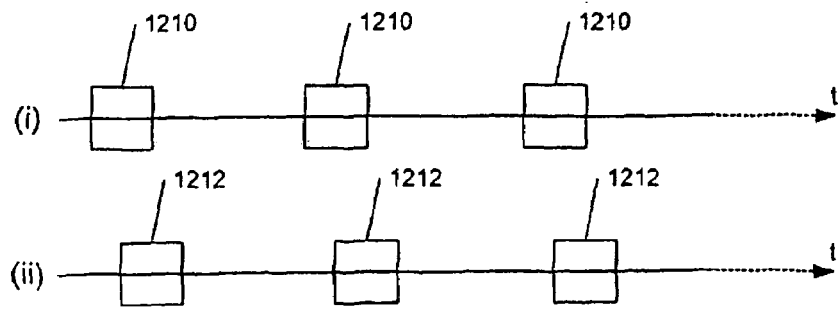

Once this initial calibration has been performed the phase control processor 1112 has the more difficult task of frequency and phase locking onto a signal from a remote transmitter and of tracking this signal. Thus at step S1206 processor 1112 controls the receiver to hunt for a signal at the pulse repetition frequency of the remote transmitter, that is at the pilot tone of the remote transmitter. The pilot tone frequency may not be known exactly but in preferred arrangements is limited to a small set of possible frequencies such as 50 MHz, 100 MHz, and 250 MHz and thus the receiver can pick each of these frequencies in turn to look for incoming UWB signals. The process of hunting for a signal at PRF is illustrated in FIG. 12b. The receiver system first runs a correlation in a set of windows 1210 spaced by intervals at the PRF frequency, averaging the correlation results over a plurality of such windows and, if no significant correlation is found, slips the windows, at the same frequency, to a slightly delayed position 1212 as shown in timeline (ii) to repeat the correlation and averaging procedure until pulses at the PRF are found. Once the PRF frequency has been found, because the correlator 514 provides a plurality of outputs corresponding to a small range of delays either side of a desired time position it is straightforward to track variations in the PRF. The clock generator 1114 (and the equivalent in the transmitter) is preferably crystal controlled and thus relatively stable and varies only slowly compared with the kilohertz PLL tracking frequency. The more difficult task is to locate the remote transmitter PRF in the first place, particularly as a pilot tone pulse is transmitted for of the order of only one in 100 pulses, and because the UWB signal is relatively low level, especially at longer ranges. These difficulties are addressed by averaging over a relatively long period in order to identify the systematic pilot tone impulses which appear at fixed times and distinguish, for example, from other UWB pulses which appear effectively at random times. Depending upon the strength of the UWB signal and upon the range and transmit channel it may take as long as one or a few seconds to lock onto the relevant pilot tone as the correlator windows are slipped, which allows averaging over extremely large number of pulses.

Once the phase control processor has locked onto the PRF of the remote receiver the processor can rely on the relative stability of clock generator 1114 and can thus rewrite the referenced wave form data table 1100 with an impulse and average over a plurality of pulses, typically between 100 and 1000 pulses, to determine the reference wave form for the transmit channel, and can then write this into the wave form data table. The number of pulses over which the signal needs to be averaged depends upon the range—one pulse may be enough at one meter and average of $10^4$ pulses may be necessary at a range of 30 meters. Once the reference wave form for a first multipath component of a transmitted pulse has been identified the phase control processor 1112 can hunt backwards and forwards from this to identify the next multipath component of the pilot tone, and this can be repeated to determine data for a plurality of multipath components of a transmitted pulse. The number of multipath components for which data is acquired depends upon a trade off between acquisition time and system sensitivity (capturing energy from more multipath components facilitates greater sensitivity but takes longer to acquire). It will be appreciated that once the pulse shapes and delays for multipath components of a pulse have been located in time and samples stored tracking the variations of these over time is relatively straightforward and may be accomplished by periodically averaging over say 100 to 1000 pulses, for example by time multiplexing correlator in a similar way to that described below.

Figure 13A:
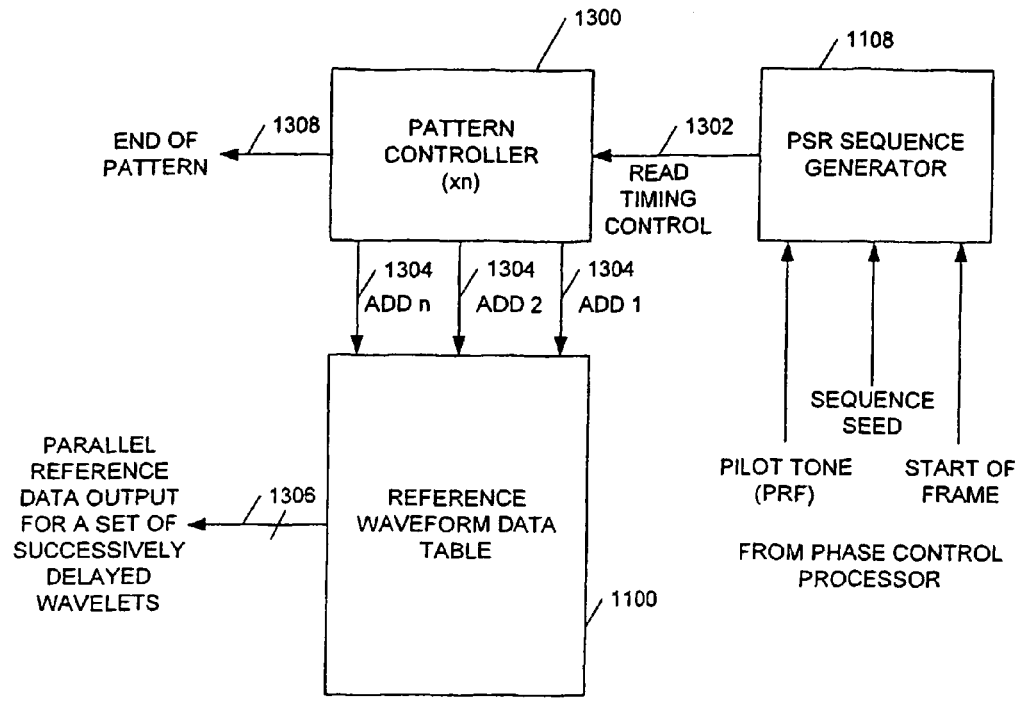
Figure 15A:
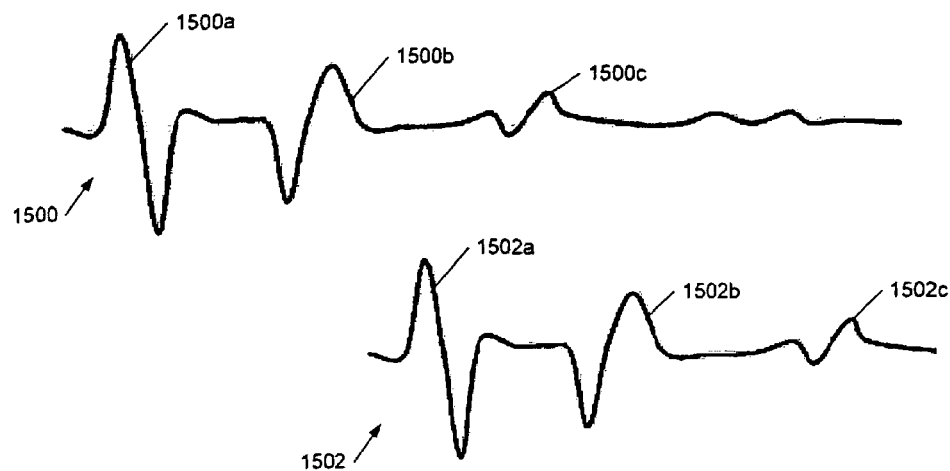
FIGS. 15a and 15b show, respectively, received signals with interleaved multipath components, and a diagrammatic illustration of the operation of the correlator of FIG. 14.

FIG. 13 shows details of the reference wave form generation system. The PSR sequence generator 1108 receives control signals from the control processor 1112 comprising a pilot tone to control the timing of the reference wave form generation, and a starter frame signal and a sequence seed to control pseudo random sequence modulation for pulse position dithering, and provides a read timing control output 1302 to a pattern controller 1300. Referring ahead to FIG. 15a, this shows the received multipath components of two successively transmitted pulses 1500 and 1502, each with a plurality of multipath components 1500a-c, 1502a-c. It can be seen that the multipath components 1500a, b of pulse 1500 arrive before the start of pulse 1502 but that the multipath component 1500c of pulse 1500 arrives between multipath components 1502a and 1502b of pulse 1502. In order to correlate the received signal with a reference wave form corresponding to pulse 1500 (or 1502) the reference wave form data table 1100 should preferably be able to provide the appropriate multipath component of the pulses at the appropriate times even when these are interleaved as shown. Although this is not essential it is preferable in order to be able to retrieve energy from more multipath components of a received signal.

Figure 13B:
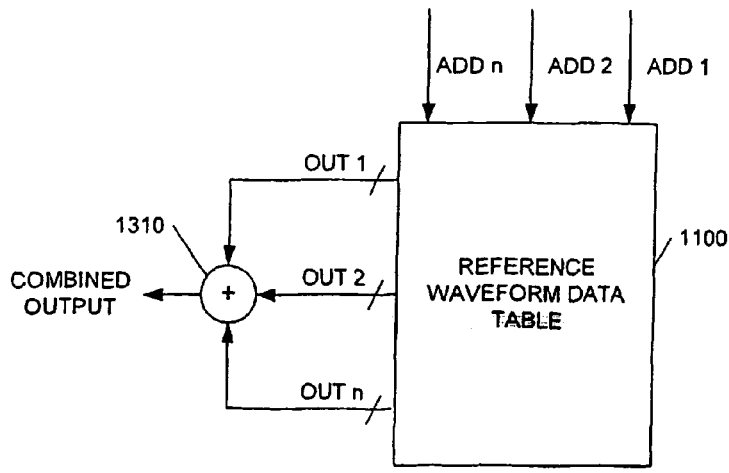

Referring back now to FIG. 13a pattern generator 1300 provides a plurality of outputs 1304 for providing reference wave forms corresponding to a plurality of transmitted pulses having overlapping multipath components. Thus, for example, if it is desired to process overlapping or interleaved multipath components from two successive transmitted pulses pattern controller 1300 provides two address outputs 1304 for addressing the wave form data table at appropriate times to provide portions of the reference wave form corresponding to the overlapping or interleaved portions of the multipath components. Thus referring again to the example of FIG. 15a pattern controller 1300 provides a first address output for controlling data table 1100 to provide multipath components 1500a, b, c and a second address output for addressing the table to provide the reference wave shapes for multipath components 1502a, b, c at appropriate times. It will be appreciated that the number of address outputs of pattern controller 1300 depends upon the delay span of the number of significant multipath components of a pulse as compared with the inter-transmit pulse spacing. The reference wave form data table 1100 provides an output 1306 which comprises a time ordered combination of the multipath components of successfully transmitted components in the example of FIG. 15a multipath components 1500a, 1500b, 1502a, 1502c, 1502b and so forth. In a preferred arrangement a single set of outputs provides these multipath components in a time multiplexed fashion for use with correlator 514 also operating in a time sliced or multiplexed configuration. However an alternative arrangement is illustrated in FIG. 13b in which data table 1100 has a plurality of sets of outputs, one for each transmitted pulse the receiver is concurrently able to process, which are combined in a summer 1310 and provided as a combined output for subsequent correlation.

Referring in more detail to the parallel data outputs from the reference wave form data table, the data table memory is configured to provide a plurality of blocks of reference signal data in parallel, each block of data being delayed with respect to a previous block of data. A block of data may comprise, for example, eight or 16 sample values of the stored reference wave form, preferably defining a multipath component of a pulse such as a one of components 1500a, b, c of FIG. 15a.

The blocks preferably overlap in time and in one arrangement each block is delayed from the previous block by one sample, 16 blocks defining 16 successfully delayed multipath pulse components being output in parallel. In this example this requires a BUS comprises 256 parallel outputs from reference output data table 100, but the majority of these outputs may be provided simply by appropriate wiring since 16 blocks each of 16 samples, each delayed by a sample requires only 32 parallel sample value outputs. Each of these sample value outputs, it will be appreciated, may comprise a single or multi-bit value, depending upon whether or single or multi-bit A/D conversion is employed. Depending upon the duration of a multipath component of a pulse such as multipath component 1500a of FIG. 15a is stored within the reference wave form data table, a block of reference data may be added with zeros at either or both ends. The use of a reference wave form data table provides important benefits to the receiver system, in particular allowing use of a lower quality receiver analog front end than would otherwise be acceptable as the above described process of self-calibration, storing referenced wave form data table 1100, can compensate for distortion within the receiver as previously described.

In operation the PSR sequence generator 1108 is responsive to the pseudo random sequence employed for transmitting the data to control the read timing from the reference wave form data table to compensate for the pseudo random (but deterministic) time modulation imposed on the variable, information—dependent phase and position modulation. Pattern controller 1300 also provides an end of pattern output signal 1308 for use in resetting the correlator as described further below.

FIG. 4 shows details of the configuration of the multiply-accumulate units of correlator 514. The correlator comprises a plurality, in one configuration 16, of multiply units 1400 each coupled to a respective accumulator 1402. Each multiplier unit 1400 receives the same block 1404 of sampled input data, as illustrated comprising 16 successively delayed samples (either one or multi-bit values). Each multiply unit 1400 also receives a block of reference signal samples 1406, in one configuration comprising 16 successive samples of the reference signal wave form, from data table 1100, but each of blocks 1406 is successively delayed so that the sampled input data is correlated in parallel by multiplier units 1400 with portions of the referenced signal wave form spanning a range (as illustrated, 16) of successive time slices of the referenced wave form. The effect of this is to slide the sampled input data block or time slice along the referenced wave form until a correlation is found but it is easier in practice to firstly change the referenced wave form delay rather than the sampled received data delay, and secondly to perform a plurality of correlation in parallel rather than employ a single slide window.

Each of multiply units 1400 comprises a multiplier to multiply each input data sample with the corresponding reference data sample and provide an output to the corresponding accumulator 1402 so that the accumulator accumulates a correlation value from all (in this case 16) correlation operations in parallel. Each accumulator has an output 1408 coupled to a partial correlation store 1410 for writing an accumulated correlation value into the store. Each accumulator also has an input 1412 from a read output of store 1410 to allow a partial correlation value written into the store to be read back from the store and added to a further correlation value in each respective accumulator. Writing of data into the store and reading of data from the store is controlled by the phase control processor 1112. The partial correlation store 1410 comprises a plurality of sets of memory locations, each set of memory locations storing a set of partial correlation values, one from each multiply-accumulate module (T1 ... T16). Storage is provided for as many sets of partial correlation values as is needed to process a desired number of transmitted pulses as overlapping or interleaved multipath components. Thus, for example, two sets of memory locations for partial correlation values are provided for storing partial correlation values where multipath components of two successively transmitted pulses overlap or interleave.

Data from each of the plurality of memory locations of a set of partial correlation results is provided on an output 1414 to discriminator module 612. Discriminator 512 also provides a memory clear output 1416 for clearing or setting to zero a set of partial correlation values, and receives an end of pattern signal 1308 from pattern controller 1300. Discriminator 612 provides an output 1418 to subsequent forward error correction modules such as a Viterbi decoder. Although reference has been made to store 1410 storing partial correlation, once the correlation of a complete set of multipath components of a received signal pulse is complete the accumulated correlation values from outputs 1418 are written into store 1410 thus providing a set of complete correlation values, that is taking account of all multipath components it has been decided to process, and these complete correlation values are available to the discriminator 612 via BUS 1414.

Figure 14:
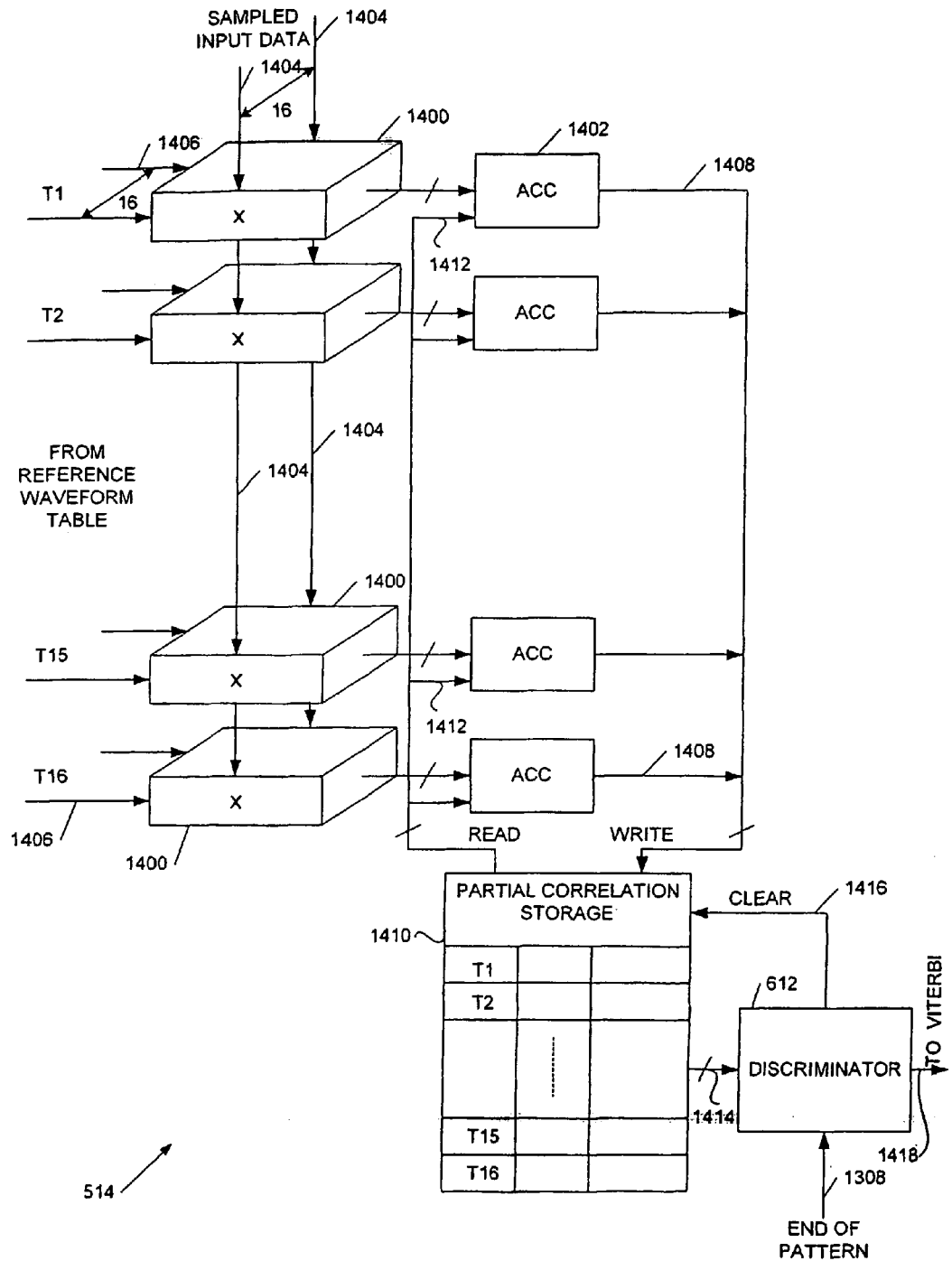
FIG. 14 shows a block diagram of a correlator for the demodulator of FIG. 6.

To illustrate the operation of the correlator 514 of FIG. 14 it is helpful to refer to FIG. 15*a*. Broadly speaking the procedure is to correlate (accumulate) the first received multipath component 1500*a* and to dump this into store 1410, and then to correlate the next multipath component 1500*b*, also accumulating the previously stored partial correlation for multipath component 1500*a* by reading this from store 1410 adding this to the partial correlation value of multipath component 1500*b*, and the total accumulated set of correlation values is then written back into store 1410. This process is continued until a multipath component of a subsequent pulse is encountered, in this case multipath component 1502*a* of pulse 1500. The pattern controller 1300 of FIG. 13 then controls the reference wave form data table 1100 to provide a pulse shape appropriate for correlating with multipath component 1502*a* and following the correlation operation the result of this correlation is dumped into a separate set of memory locations within store 1410, this set of memory locations being allocated to the second pulse. The correlation operation for multipath components of the received signal continues with the partial correlation results being written into the set of memory locations for either the first or second pulse as appropriate, the pattern generator controlling the wave form data table to generate a reference wave shape for the appropriate multipath component. Thus continuing with the example of FIG. 15*a* multipath component 1500*c* of the first pulse is next accumulated with the partial correlation value read from store 1410 for the first pulse and dumped back into store 1410. In this case this is the final processed multipath component pulse of 1500 though the accumulated correlation values in store 1410 for the first pulse can then be taken as complete correlation values and processed by discriminator 612. The signal indicating that the complete set of multipath components has been correlated is provided by pattern controller 1300 since this controller is able to determine that the final stored multipath component has been processed. However correlation of pulse 1502 continues with multipath component 1502*b* and when the first multipath component of a third pulse (is not shown in FIG. 1500*a*) received the set of partial correlation values which was previously used for pulse 1500 (and which was cleared by discriminator 612 after the complete correlation values for pulse 1500 were processed) is available for use for accumulating correlation values for this third pulse.

Figure 15B:
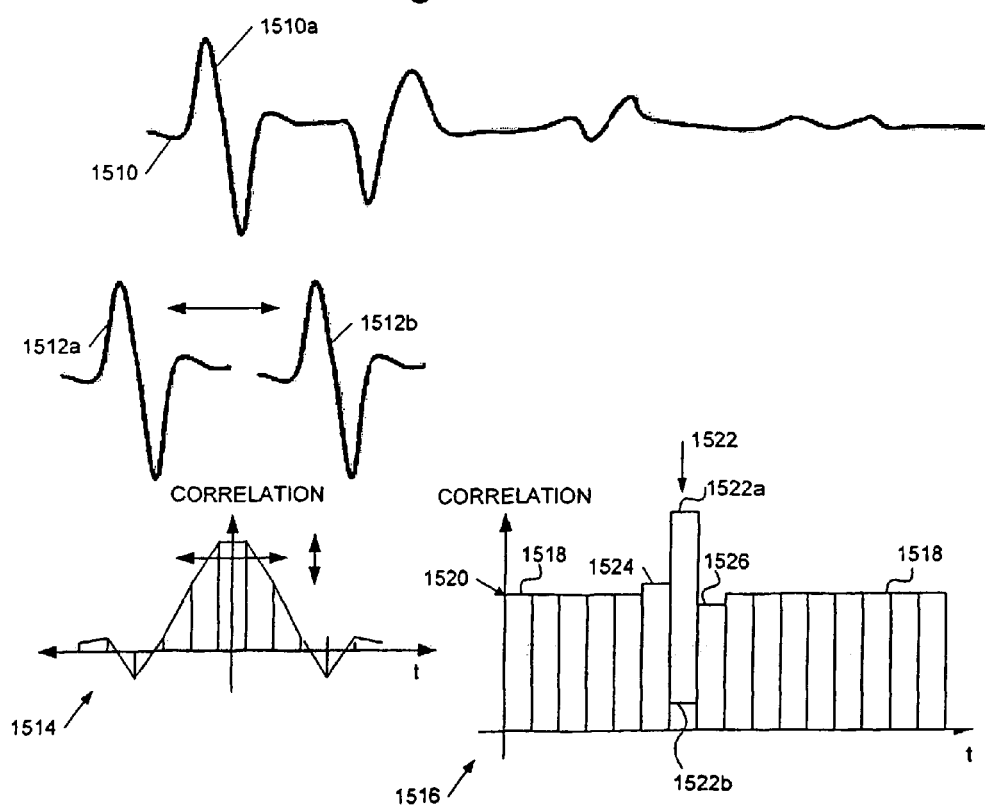

FIG. 15*b* shows, diagrammatically, the correlation of a multipath component 1510*a* of a received UWB signal pulse 1510 with a set of referenced pulses 1512*a, b* of which, for clarity, only two are shown. The referenced signal pulses are time shifted to either side of the received multipath component 1510*a* and correlation with each of these referenced signal pulses provides a correlation value as schematically illustrated in graph 1514. The shape of this curve, and the height and width of its peak may alter depending upon the received signal and referenced signal shape. In FIG. 15*b* a set of (full) correlation values output from storage 1410 to discriminator 612 on BUS 1414 is diagrammatically illustrated by bar chart 1516 in which each bar 1518 represents an accumulated correlation value for one of the delayed versions of the referenced signal multipath component 1512. It can be seen that most of the accumulated correlation values are close to a mean level 1520 but one of the accumulated values represented by bar 1522 is significantly different from the others. This represents the most likely pulse position; the bars 1524, 1526 to either side of it represents next most probable pulse positions. Bar 1522*a* is significantly greater than the average 1520 which applies a positive correlation (normal pulse) whilst bar 1522*b* has a correlation value which is significantly less (more negative) than the average which implies a negative correlation that is an inverted received signal pulse as compared with the reference. Thus the correlator of FIG. 14*b* is able to co-determine both the likely position (in time) of a received signal pulse and also the phase (normal or inverted) of the pulse and hence to co-determine information data modulated to both pulse position and pulse phase simultaneously. The use of both position and phase simultaneously to encode information data significantly enhances the information data carrying capacity of the system.

In the above described system the correlator is employed for correlating successive multipath components of received signal pulses. However essentially the same arrangement can also be used for accumulating relation values for successively transmitting impulses carrying the same data. In other words a transmitter and/or receiver may employ redundancy, using two or more transmit pulses to carry substantially the same data, at the receiver processing these as though they were merely multipath components of a single pulse. This reduces the effective data rate (halving data rate where two pulses are received instead of one to transmit a given symbol) but potentially increases the range of a transmission system by providing greater energy per transmitted symbol. Such an arrangement may be employed adaptively, reducing the data rate but increasing reliability where transmission conditions are difficult or at the edge of range of a system. The reduction in effective data rate may be partially compensated for by increasing the pulse repetition frequency, providing that operation within the desired regulatory spectral envelope is maintained; the transmit power may also be adaptively controlled to facilitate this.

No doubt alternatives will occur to the skilled person. It will be understood that the invention is not limited to the described embodiments and encompasses modifications apparent to those skilled in the art lying within the scope of the claims appended hereto.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding Great Britain application No. 0316897.8, filed Jul. 18, 2003, and U.S. Provisional Application Ser. No. 60/518,344, filed Nov. 10, 2003, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

We claim:

1. An ultra wideband (UWB) receiver system comprising:
   a receiver front end to receive a UWB signal;
   an analogue-to-digital converter coupled to said receiver front end to digitise said received UWB signal;
   a correlator coupled to said analogue-to-digital converter to correlate said digitised UWB signal with a reference signal,
   a reference signal memory to store said reference signal and controller to determine reference signal data from said digitised UWB signal, and to write said determined data into said reference signal memory; and wherein said receiver front end includes a received signal level adjuster, and wherein said signal level adjuster is responsive to said reference signal.

2. A UWB receiver system as claimed in claim 1 wherein said UWB signal comprises a plurality of pulses, and wherein said correlator comprises a plurality of correlation modules to perform a plurality of correlations substantially in parallel between said digitised UWB signal and differently delayed versions of said reference signal to locate said pulse.

3. A UWB receiver system as claimed in claim 2 wherein said correlator further comprises a discriminator coupled to outputs of said correlation modules to identify said pulse.

4. A UWB receiver system as claimed in claim 2 wherein said correlator is configured to locate a position in time of said pulse.

5. A UWB receiver system as claimed in claim 4 wherein said correlator is further configured to determine a phase of said pulse.

6. A UWB receiver system as claimed in claim 2 wherein each said pulse has a plurality of multipath components, and wherein each said module is configured to correlate a plurality of multipath components of a said pulse with said reference signal.

7. A UWB receiver system as claimed in claim 1 wherein said UWB signal comprises a plurality of pulses, wherein each said pulse has a plurality of multipath components, and wherein said correlator comprises at least one multiply-accumulate module configured to correlate a plurality of said multipath components of a said pulse with said reference signal.

8. A UWB receiver system as claimed in claim 1 wherein said analogue-to-digital converter comprises a plurality of analogue-to-digital conversion modules to provide a plurality of successively delayed digital samples of said UWB signal substantially in parallel, and wherein said correlator is configured to process said successively delayed digital samples substantially simultaneously, whereby said receiver system is configured to correlate a portion of said received UWB signal comprising a plurality of samples of said signal with a portion of said reference signal.

9. A UWB receiver system as claimed in claim 8 wherein said UWB signal comprises a plurality of pulses, and wherein said portion of received UWB signal has a duration of substantially a duration of a multipath component of said pulse.

10. A UWB receiver system as claimed in claim 1 wherein said receiver front end includes a power controller to control a power supply to said analogue-to-digital converter, and wherein said power controller is responsive to said reference signal.

11. A UWB receiver system as claimed in claim 1 for reception of said UWB signals from a plurality of UWB transmitters, further comprising means to select one of a plurality of said reference signals for receiving a signal from a corresponding one of said transmitters.

12. A UWB receiver system as claimed in claim 1 wherein said analogue-to-digital converter is configured to operate at greater than 1 G samples/second.

13. An ultra wideband (UWB) receiver system comprising:
   a receiver front end to receive a UWB signal;
   an analogue-to-digital converter coupled to said receiver front end to digitise said received UWB signal; and
   a correlator coupled to said analogue-to-digital converter to correlate said digitised UWB signal with a reference signal,
   wherein said receiver front end includes a received signal level adjuster, and further comprising a monitor to store at least one statistical characteristic of said UWB signal, and a controller to control said signal level adjuster responsive to said monitor.

* * * * *